United States Patent
Chong et al.

(10) Patent No.: US 12,342,225 B2
(45) Date of Patent: Jun. 24, 2025

(54) COMMUNICATION METHOD, COMMUNICATION APPARATUS, DEVICE, AND COMMUNICATION SYSTEM

(71) Applicant: HUAWEI TECHNOLOGIES CO., LTD., Guangdong (CN)

(72) Inventors: Weiwei Chong, Shenzhen (CN); Yang Xin, Shanghai (CN); Xiaobo Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 487 days.

(21) Appl. No.: 17/725,498

(22) Filed: Apr. 20, 2022

(65) Prior Publication Data
US 2022/0248287 A1    Aug. 4, 2022

Related U.S. Application Data

(63) Continuation of application No. PCT/CN2020/070771, filed on Jan. 7, 2020.

(30) Foreign Application Priority Data

Oct. 22, 2019  (WO) ................ PCT/CN2019/112543

(51) Int. Cl.
*H04W 36/00* (2009.01)
*H04W 36/30* (2009.01)

(52) U.S. Cl.
CPC .............. *H04W 36/0058* (2018.08); *H04W 36/008355* (2023.05); *H04W 36/304* (2023.05)

(58) Field of Classification Search
None
See application file for complete search history.

(56) References Cited

U.S. PATENT DOCUMENTS

| 10,063,431 | B1 | 8/2018 | Kollipara |
| 2013/0308601 | A1 | 11/2013 | Brownworth et al. |
| 2016/0330660 | A1* | 11/2016 | Wong ................ H04W 36/302 |
| 2017/0026888 | A1* | 1/2017 | Kwan ................ H04W 36/304 |

(Continued)

FOREIGN PATENT DOCUMENTS

| CN | 1505907 A | 6/2004 |
| CN | 1628476 A | 6/2005 |

(Continued)

OTHER PUBLICATIONS

3GPP TS 28.201 V0.0.0 (Sep. 2019), 3rd Generation Partnership Project; Technical Specification Group Services and System Aspects; Charging management; Network slice performance and analytics charging in the 5G System (5GS); Stage 2(Release 16), 7 pages.

(Continued)

*Primary Examiner* — Lonnie V Sweet

(57) ABSTRACT

This application provides a communication method, a communication apparatus, a device, and a communication system. A data analytics network element determines a service quality analytics result for a target terminal device, and sends the service quality analytics result to an access network element. After receiving the service quality analytics result, the access network element may perform handover decision on the target terminal device based on the service quality analytics result.

20 Claims, 9 Drawing Sheets

(56) References Cited

U.S. PATENT DOCUMENTS

2020/0045559 A1* 2/2020 Kim ................. H04W 28/0268
2021/0014141 A1* 1/2021 Patil .................... H04W 76/25

FOREIGN PATENT DOCUMENTS

| CN | 102355692 A | 2/2012 |
| --- | --- | --- |
| CN | 102843736 A | 12/2012 |
| CN | 106454970 A | 2/2017 |
| CN | 107241773 A | 10/2017 |
| CN | 107302777 A | 10/2017 |
| CN | 108271224 A | 7/2018 |
| CN | 110166377 A | 8/2019 |
| EP | 2515498 A1 | 10/2012 |
| WO | 2007100230 A1 | 9/2007 |
| WO | 2017137089 A1 | 8/2017 |
| WO | 2017166968 A1 | 10/2017 |
| WO | 2019062499 A1 | 4/2019 |

OTHER PUBLICATIONS

3GPP TS 23.288 V16.1.0 (Sep. 2019), 3rd Generation Partnership Project; Technical Specification Group Services and System Aspects; Architecture enhancements for 5G System (5GS) to support network data analytics services(Release 16), 52 pages.

S2-1909290, Huawei et al., Proposal of Key Issue: UE driven analytics for network (re)access and handover optimization, 3GPP TSG-SA WG2 Meeting #135, Split, Croatia, Oct. 14-18, 2019, 2 pages.

S2-1812442, ZTE, Update to the solution 10 for Key Issue 9: Customizing mobility management based on NWDAF output, SA WG2 Meeting #129bis, Nov. 26-30, 2018, West Palm Beach, USA, 4 pages.

* cited by examiner

COMMUNICATION METHOD, COMMUNICATION APPARATUS, DEVICE, AND COMMUNICATION SYSTEM

CROSS-REFERENCE TO RELATED APPLICATION

This application is a continuation of International Application No. PCT/CN2020/070771 filed on Jan. 7, 2020, which claims priority to International Application No. PCT/CN2019/112543 filed on Oct. 22, 2019. The disclosure of the aforementioned applications are hereby incorporated by reference in their entireties.

TECHNICAL FIELD

This application relates to the field of wireless communication technologies, and in particular, to a communication method, a communication apparatus, a device, and a communication system.

BACKGROUND

In a wireless communication network, access network elements such as a base station may need to perform cell handover on accessed user equipment (UE). For example, when signal quality of a cell in which the UE is currently located is poorer and signal quality of a neighboring cell of the cell in which the UE is currently located is better, the base station may hand over the UE from the cell in which the UE is currently located to the neighboring cell with better signal quality so that the UE is provided with corresponding services in the cell with better signal quality.

Currently, an access network element usually performs cell handover decision on UE based on a measurement report reported by the UE. To be specific, when the measurement report indicates that signal quality of a cell in which the UE is currently located is lower than a preset threshold and that signal quality of a neighboring cell is higher than the preset threshold, the access network element may determine to hand over the UE to the neighboring cell. However, performing cell handover on the UE based on the measurement report may not ensure service quality of the UE, and may even reduce the service quality of the UE.

SUMMARY

To resolve the foregoing problem, embodiments of this application provide a communication method, a communication apparatus, a device, and a communication system, so that an access network element can perform cell handover decision on a terminal device based on a more reliable handover decision basis.

According to a first aspect, an embodiment of this application provides a communication method. The method includes: An access network element obtains a service quality analytics result for a target terminal device from a data analytics network element; and the access network element performs a handover decision on the target terminal device based on the service quality analytics result. In the implementation, the service quality analytics result may reflect service quality of the target terminal device. Therefore, when the service quality analytics result indicates that the service quality of the terminal device is low and does not meet a service use requirement of the target terminal device, it indicates that currently there is a necessity to improve the service quality of the target terminal device by switching a cell in which the target terminal device is located. In this case, the access network element may perform cell handover decision on the target terminal device based on the service quality analytics result, to improve reliability of a handover decision basis.

In a possible implementation, the access network element performs handover decision on the target terminal device based on the service quality analytics result includes: The access network element determines to perform cell handover on the target terminal device when the service quality analytics result meets a first preset condition. The method further includes: The access network element performs cell handover on the target terminal device. In the implementation, the access network element may specifically determine to perform cell handover on the target terminal device when the received service quality analytics result meets a specific preset condition, for example, when the service quality analytics result indicates that the service quality of the target terminal device is low. Accordingly, after determining that cell handover needs to be performed on the target terminal device, the access network element may hand over the target terminal device from the current cell to another cell.

In a possible implementation, that the access network element performs handover decision on the target terminal device based on the service quality analytics result includes: The access network element determines to perform cell handover on the target terminal device when the service quality analytics result meets a first preset condition and signal quality of a cell in which the target terminal device is located meets a second preset condition. In the implementation, the access network element performs cell handover decision on the target terminal device using the service quality analytics result for the target terminal device as a decision basis and based on the signal quality of the cell in which the terminal device is currently located. That is, the access network element determines to perform cell handover on the target terminal device only when both the service quality analytics result and the signal quality of the cell in which the target terminal device is located meet corresponding conditions.

In a possible implementation, the method further includes: The access network element determines priority information corresponding to the first service quality analytics result and priority information corresponding to the second service quality analytics result; and that the access network element performs handover decision on the target terminal device based on the service quality analytics result includes: The access network element performs handover decision on the target terminal device based on the first service quality analytics result, the priority information corresponding to the first service quality analytics result, the second service quality analytics result, and the priority information corresponding to the second service quality analytics result. In the implementation, if receiving at least two service quality analytics results, the access network element may determine a priority of each service quality analytics result based on priority information corresponding to each service quality analytics result, that is, determine a specific service quality analytics result based on which the access network element performs cell handover decision on the terminal device.

In further possible implementations, the first service quality analytics result and the second service quality analytics result correspond to different service types or different data transmission channels. In the implementation, the data analytics network element may separately determine corresponding service quality analytics results for different types of services (such as a game service and a voice service) of the target terminal device, different data transmission channels of the target terminal device, or the like, so that the access network element determines, based on a service or a data transmission channel of the target terminal device, whether to perform cell handover on the target terminal device.

In a possible implementation, the method further includes: The access network element reports an access network parameter value that can be met by the access network element to the data analytics network element, where the access network parameter value is used to generate the service quality analytics result. In the implementation, the access network element may actively or passively report the access network parameter value required by the data analytics network element to generate the service quality analytics result to the data analytics network element, so that the data analytics network element obtains the access network parameter value.

In some possible implementations, that an access network element obtains a service quality analytics result for a target terminal device from a data analytics network element includes: The access network element sends a service quality analytics request to the data analytics network element, where the service quality analytics request is used to request the service quality analytics result from the data analytics network element; and the access network element receives the service quality analytics result sent by the data analytics network element in response to the service quality analytics request. In the implementation, the access network element may initiate a request to the data analytics network element, to request the data analytics network element to generate the service quality analytics result for the terminal device. Certainly, in another possible implementation, alternatively, the data analytics network element may periodically feed back the service quality analytics result for the terminal device to the access network element, or another network element may initiate a request to the data analytics network element.

In some possible implementations, that the access network element sends a service quality analytics request to the data analytics network element includes: The access network element sends a service quality analytics request for the target terminal device to the data analytics network element when the access network element receives a measurement report reported by the target terminal device; or the access network element sends a service quality analytics request for the target terminal device to the data analytics network element when a measurement report received by the access network element indicates that the signal quality of the cell in which the target terminal device is located meets a third preset condition. In the implementation, the access network element may request a corresponding service quality analytics result from the data analytics network element when receiving the measurement report reported by the target terminal device. Alternatively, the access network element may request a corresponding service quality analytics result from the data analytics network element when determining, after receiving the measurement report, whether the measurement report indicates that the signal quality of the cell in which the target terminal device is currently located meets a specific condition, for example, the signal quality of the cell in which the target terminal device is currently located is lower than a specific value.

In some possible implementations, the service quality analytics request includes indication information, and the indication information indicates to request a service quality analytics result corresponding to an online service of the target terminal device. In the implementation, when requesting the service quality analytics result for the target terminal device from the data analytics network element, the access network element may request only the service quality analytics result corresponding to the online service from the data analytics network element. The online service of the terminal device is a service currently being performed by the terminal device, for example, a real-time voice service.

In some possible implementations, the service quality analytics result meets a reporting condition, and the method further includes: The access network element sends the reporting condition to the data analytics network element. In the implementation, after determining that the service quality analytics result is obtained, the data analytics network element does not necessarily report the service quality analytics result to the access network element, but may send the service quality analytics result to the access network element only when the service quality analytics result meets a specific reporting condition. This can reduce a quantity of times that the data analytics network element reports the service quality analytics result, thereby reducing a quantity of times of data exchange between network elements. The reporting condition that needs to be met when the data analytics network element reports the service quality analytics result may be sent by the access network element, and certainly may be sent by a core network element in other possible implementations, for example, a PCF network element.

According to a second aspect, an embodiment of this application further provides a communication method. The method includes: A data analytics network element determines a service quality analytics result for a target terminal device; and the data analytics network element sends the service quality analytics result to an access network element, where the service quality analytics result is used to perform handover decision on the target terminal device. In the implementation, the data analytics network element may determine a corresponding service quality analytics result for the target terminal device, and send the corresponding service quality analytics result to the access network element. Because the service quality analytics result may reflect service quality of the target terminal device, when the service quality analytics result indicates that the service quality of the terminal device is low and does not meet a service use requirement of the target terminal device, the access network element may perform cell handover decision on the target terminal device based on the received service quality analytics result, to improve reliability of a handover decision basis.

In some possible implementations, the service quality analytics result includes a first service quality analytics result and a second service quality analytics result for the target terminal device, and the first service quality analytics result and the second service quality analytics result correspond to different service types or data transmission channels. In the implementation, the data analytics network element may separately determine corresponding service quality analytics results for different types of services (such as a game service and a voice service) of the target terminal device, different data transmission channels of the target terminal device, or the like, so that the access network element determines, based on a service or a data transmission channel of the target terminal device, whether to perform cell handover on the target terminal device.

In some possible implementations, the method further includes: The data analytics network element sends first indication information to the access network element, where the first indication information is used to indicate that the service quality analytics result is a service quality analytics result corresponding to an online service of the target terminal device. In the implementation, the access network element may indicate, to the data analytics network element by using the first indication information, that the service quality analytics result is the service quality analytics result corresponding to the online service. The online service of the terminal device is a service currently being performed by the terminal device, for example, a real-time voice service.

In some possible implementations, the method further includes: The data analytics network element receives a service quality analytics request sent by the access network element or a core network element, where the service quality analytics request is used to request the service quality analytics result for the target terminal device. In the implementation, the access network element may request the service quality analytics result for the target terminal device from the data analytics network element by sending a request, or the core network element may request the service quality analytics result from the data analytics network element.

In some possible implementations, the service quality analytics request includes second indication information, and the second indication information indicates to request the service quality analytics result corresponding to the online service of the target terminal device. In the implementation, when the service quality analytics result is requested from the data analytics network element, the corresponding second indication information may be added to the service quality analytics request, to indicate the data analytics network element to feed back the corresponding service quality analytics result for the online service of the target terminal device.

In some possible implementations, the method further includes: The data analytics network element obtains a core network parameter value that can be met by the core network element. That a data analytics network element determines a service quality analytics result for a target terminal device includes: The data analytics network element determines the service quality analytics result for the target terminal device based on the core network parameter value. In the implementation, the data analytics network element may perform analytics processing on the core network parameter value of the core network element, to generate the corresponding service quality analytics result.

In some possible implementations, that a data analytics network element determines a service quality analytics result for a target terminal device includes: The data analytics network element obtains, in response to the service quality analytics request, a corresponding service feature parameter used to generate the service quality analytics result for the target terminal device; and the data analytics network element performs analytics processing on the service feature parameter to obtain the service quality analytics result. In the implementation, the data analytics network element may specifically perform analytics processing on a service-related service feature parameter of the target terminal device, to obtain the service quality analytics result that indicates the service quality of the target terminal device.

In some possible implementations, the service feature parameter meets a first reporting condition, and the method further includes: The data analytics network element receives a second reporting condition sent by the access network element or the core network element for the service quality analytics result; and the data analytics network element determines the first reporting condition of the service feature parameter based on the second reporting condition. In the implementation, the data analytics network element may send the service quality analytics result to the access network element only when the determined service quality analytics result meets a specific reporting condition (that is, the second reporting condition), where the second reporting condition may be sent by the access network element, or may be sent by the core network element. Accordingly, to reduce a quantity of service feature parameters that need to be obtained for generating the service quality analytics result by the data analytics network element, the data analytics network element may calculate, based on the second reporting condition, a first reporting condition corresponding to each network element, and send the first reporting condition to the corresponding network element, so that each network element reports only a service feature parameter that meets the corresponding first reporting condition to the data analytics network element, and may not report a service feature parameter that does not meet the first reporting condition.

In some possible implementations, that the data analytics network element sends the service quality analytics result to an access network element includes: The data analytics network element sends the service quality analytics result to the access network element when the service quality analytics result meets the second reporting condition. In the implementation, the data analytics network element may send the service quality analytics result to the access network element only when the determined service quality analytics result meets a specific reporting condition (that is, the second reporting condition), and the data analytics network element may not send a service quality analytics result that does not meet the second reporting condition to the access network element. This can reduce a quantity of times that the data analytics network element reports the service quality analytics result to the access network element, thereby reducing a quantity of times of data exchange in a network.

In some possible implementations, the method further includes: The data analytics network element receives a target access network parameter value sent by the core network element; the data analytics network element determines an updated service quality analytics result based on the target service quality parameter; and the data analytics network element sends the updated service quality analytics result to the access network element. In the implementation, the data analytics network element may perform analytics processing on the access network parameter value sent by the core network element, to generate the updated service quality analytics result corresponding to the access network parameter value.

According to a third aspect, an embodiment of this application further provides a communication method. The method includes: A core network element receives a service quality analytics result for a target terminal device sent by a data analytics network element; and the core network element forwards the service quality analytics result to an access network element, so that the access network element performs handover decision on the target terminal device based on the service quality analytics result. In the implementation, the core network element may forward the service quality analytics result determined by the data analytics network element to the access network element, so that the access network element can determine, based on the service quality analytics result, whether to perform cell handover on the target terminal device. Because the service quality analytics result may reflect service quality of the target terminal device, when the service quality analytics result indicates that the service quality of the terminal device is low and does not meet a service use requirement of the target user equipment, it indicates that currently there is a necessity to improve the service quality of the target terminal device by switching the cell in which the target terminal device is located. In this case, the access network element may perform cell handover decision on the target terminal device based on the service quality analytics result, to improve reliability of a handover decision basis.

In some possible implementations, the service quality analytics result includes a first service quality analytics result and a second service quality analytics result for the target terminal device, and the method further includes: The core network element delivers, to the access network element, priority information corresponding to the first service quality analytics result and priority information corresponding to the second service quality analytics result, where the priority information corresponding to the first service quality analytics result and the priority information corresponding to the second service quality analytics result are used to perform cell handover decision on the target terminal device. In the implementation, the core network element may deliver priority information corresponding to different service quality analytics results for a same target terminal device to the access network element. In this way, the access network element may determine, based on the received priority information corresponding to the different service quality analytics results, which service quality analytics result is to perform cell handover decision on the target terminal device.

In some possible implementations, the method further includes: The core network element sends a service quality analytics request to the data analytics network element, where the service quality analytics request is used to request the service quality analytics result for the target terminal device from the data analytics network element. In the implementation, the core network element may actively initiate a service quality analytics request to the data analytics network element, or may forward, to the data analytics network element, a service quality analytics request initiated by the access network element, to request the data analytics network element to generate a corresponding service quality analytics result.

In some possible implementations, the service quality analytics request includes indication information, and the indication information indicates to request a service quality analytics result corresponding to an online service of the target terminal device. In the implementation, the access network element may include the indication information in the service quality analytics result sent by the access network element to the data analytics network element, to request only the service quality analytics result corresponding to the online service from the data analytics network element by using the indication information. The online service of the terminal device is a service currently being performed by the terminal device, for example, a real-time voice service.

In some possible implementations, the method further includes: The core network element receives a service establishment request sent by a service server, where the service establishment request is used to establish a service of the target terminal device. In the implementation, when the target terminal device requests a service, the core network element may establish a corresponding service on a network side for the target terminal device. Specifically, the core network element may establish a data transmission channel corresponding to the service for the target terminal device, to transmit corresponding service data for the target terminal device based on the data transmission channel.

In some possible implementations, the method further includes: The core network element reports a core network parameter value that can be met by the core network element to the data analytics network element, where the core network parameter value is used to generate the service quality analytics result. In the implementation, the core network element may actively or passively report, to the data analytics network element, the core network parameter value required for generating the service quality analytics result, to determine the service quality of the target terminal device based on the core network parameter value.

In some possible implementations, that the core network element reports a core network parameter value that can be met by the core network element to the data analytics network element includes: The core network element receives a data report request sent by the data analytics network element, where the data report request is used to request the core network element to report a corresponding service feature parameter for generating the service quality analytics result for the target terminal device; and the core network element reports the service feature parameter to the data analytics network element in response to the data report request. In the implementation, the core network element may passively send the core network parameter value to the data analytics network element. Specifically, the core network element may be triggered, based on the data report request sent by the data analytics network element, to send the core network parameter value to the data analytics network element.

In some possible implementations, the service feature parameter meets a first reporting condition, where the first reporting condition is determined based on a second reporting condition, and the second reporting condition is used to indicate the data analytics network element to send the service quality analytics result to the core network element when the service quality analytics result meets the second reporting condition. In the implementation, the data analytics network element may send the service quality analytics result to the access network element only when the determined service quality analytics result meets a specific reporting condition (that is, the second reporting condition), where the second reporting condition may be sent by the access network element, or may be sent by the core network element. Accordingly to reduce a quantity of service feature parameters that need to be obtained for generating the service quality analytics result by the data analytics network element, the data analytics network element may calculate, based on the second reporting condition, a first reporting condition corresponding to each network element, and send the first reporting condition to the corresponding network element, so that each network element reports only a service feature parameter that meets the corresponding first reporting condition to the data analytics network element, and may not report a service feature parameter that does not meet the first reporting condition.

In some possible implementations, the method further includes: the core network element adjusts, when the core network element determines that the received service quality analytics result meets a preset condition, an access network parameter value corresponding to the service quality analytics result. In the implementation, after receiving the service quality analytics result sent by the data analytics network element, the core network element may determine whether the service quality analytics result meets a specific condition, and if yes, may determine that the access network parameter value needs to be adjusted, and determine an adjusted access network parameter value.

In some possible implementations, the method further includes: The core network element sends the adjusted access network parameter value to the data analytics network element; and the core network element receives an updated service quality analytics result determined by the data analytics network element based on the adjusted access network parameter value. In the implementation, the core network element may send the adjusted access network parameter value to the data analytics network element, to obtain the new service quality analytics result determined by the data analytics network element based on the adjusted access network parameter value.

In some possible implementations, the method further includes: The core network element sends the updated service quality analytics result to the access network element. In the implementation, the core network element may send, to the access network element, the updated service quality analytics result determined by the data analytics network element based on the adjusted access network parameter value, so that the access network element may perform cell handover decision on the target terminal device based on the updated service quality analytics result.

According to a fourth aspect, an embodiment of this application further provides a communication apparatus, where the apparatus is used in an access network element, and the apparatus includes: an obtaining module, configured to obtain a service quality analytics result for a target terminal device from a data analytics network element; and a handover decision module, configured to perform handover decision on the target terminal device based on the service quality analytics result.

In some possible implementations, the handover decision module is specifically configured to determine to perform cell handover on the target terminal device when the service quality analytics result meets a first preset condition. The apparatus further includes a handover module, configured to perform cell handover on the target terminal device.

In some possible implementations, the handover decision module is specifically configured to determine to perform cell handover on the target terminal device when the service quality analytics result meets a first preset condition and signal quality of a cell in which the target terminal device is located meets a second preset condition.

In some possible implementations, the apparatus further includes a determining module, configured to determine priority information corresponding to the first service quality analytics result and priority information corresponding to the second service quality analytics result. The handover decision module is specifically configured to perform handover decision on the target terminal device based on the first service quality analytics result, the priority information corresponding to the first service quality analytics result, the second service quality analytics result, and the priority information corresponding to the second service quality analytics result.

In some possible implementations, the apparatus further includes a reporting module, configured to report an access network parameter value that can be met by the access network element to the data analytics network element, where the access network parameter value is used to generate the service quality analytics result.

In some possible implementations, the obtaining module includes a sending unit, configured to send a service quality analytics request to the data analytics network element, where the service quality analytics request is used to request the service quality analytics result from the data analytics network element; and a receiving unit, configured to receive the service quality analytics result sent by the data analytics network element in response to the service quality analytics request.

In some possible implementations, the sending unit is specifically configured to: send a service quality analytics request for the target terminal device to the data analytics network element when the access network element receives a measurement report reported by the target terminal device; or send a service quality analytics request for the target terminal device to the data analytics network element when a measurement report received by the access network element indicates that the signal quality of the cell in which the target terminal device is located meets a third preset condition.

In some possible implementations, the service quality analytics request includes indication information, and the indication information indicates to request a service quality analytics result corresponding to an online service of the target terminal device.

In some possible implementations, the service quality analytics result meets a reporting condition, and the apparatus further includes a sending module, configured to send the reporting condition to the data analytics network element.

The communication apparatus provided in the fourth aspect corresponds to the communication method provided in the first aspect. Therefore, for various possible implementations of the communication apparatus provided in the fourth aspect, refer to the various possible implementations of the communication method provided in the first aspect.

According to a fifth aspect, an embodiment of this application further provides a communication apparatus, where the apparatus includes: a first determining module, configured to determine a service quality analytics result for a target terminal device; and a first sending module, configured to send the service quality analytics result to an access network element, where the service quality analytics result is used to perform handover decision on the target terminal device.

In some possible implementations, the service quality analytics result includes a first service quality analytics result and a second service quality analytics result for the target terminal device, and the first service quality analytics result and the second service quality analytics result correspond to different service types or data transmission channels.

In some possible implementations, the apparatus further includes a second sending module, configured to send first indication information to the access network element, where the first indication information is used to indicate that the service quality analytics result is a service quality analytics result corresponding to an online service of the target terminal device.

In some possible implementations, the apparatus further includes a first receiving module, configured to receive a service quality analytics request sent by the access network element or a core network element, where the service quality analytics request is used to request the service quality analytics result for the target terminal device.

In some possible implementations, the service quality analytics request includes second indication information, and the second indication information indicates to request the service quality analytics result corresponding to the online service of the target terminal device.

In some possible implementations, the apparatus further includes an obtaining module, configured to obtain a core network parameter value that can be met by the core network element. The first determining module is specifically configured to determine the service quality analytics result for the target terminal device based on the core network parameter value.

In some possible implementations, the first determining module includes: an obtaining unit, configured to obtain, in response to the service quality analytics request, a corresponding service feature parameter used to generate the service quality analytics result for the target terminal device; and an analytics processing unit, configured to perform analytics processing on the service feature parameter to obtain the service quality analytics result.

In some possible implementations, the service feature parameter meets a first reporting condition, and the apparatus further includes: a second receiving module, configured to receive a second reporting condition sent by the access network element or the core network element for the service quality analytics result; and a second determining module, configured to determine the first reporting condition of the service feature parameter based on the second reporting condition.

In some possible implementations, the first sending module is specifically configured to send the service quality analytics result to the access network element when the service quality analytics result meets the second reporting condition.

In some possible implementations, the apparatus further includes a third receiving module, configured to receive an updated network parameter value sent by the core network element; and a third determining module, configured to determine an updated service quality analytics result based on the updated network parameter value; and a third sending module, configured to send the updated service quality analytics result to the access network element.

The communication apparatus provided in the fifth aspect corresponds to the communication method provided in the second aspect. Therefore, for various possible implementations of the communication apparatus provided in the fifth aspect, refer to the various possible implementations of the communication method provided in the second aspect.

According to a sixth aspect, an embodiment of this application further provides a communication apparatus, where the apparatus includes: a first receiving module, configured to receive a service quality analytics result for a target terminal device sent by a data analytics network element; and a forwarding module, configured to forward the service quality analytics result to an access network element, so that the access network element performs handover decision on the target terminal device based on the service quality analytics result.

In some possible implementations, the service quality analytics result includes a first service quality analytics result and a second service quality analytics result for the target terminal device, and the apparatus further includes: a delivery module, configured to deliver, to the access network element, priority information corresponding to the first service quality analytics result and priority information corresponding to the second service quality analytics result, where the priority information corresponding to the first service quality analytics result and the priority information corresponding to the second service quality analytics result are used to perform cell handover decision on the target terminal device.

In some possible implementations, the apparatus further includes a first sending module, configured to send a service quality analytics request to the data analytics network element, where the service quality analytics request is used to request the service quality analytics result for the target terminal device from the data analytics network element.

In some possible implementations, the service quality analytics request includes indication information, and the indication information indicates to request a service quality analytics result corresponding to an online service of the target terminal device.

In some possible implementations, the apparatus further includes a second receiving module, configured to receive a service establishment request sent by a service server, where the service establishment request is used to establish a service of the target terminal device.

In some possible implementations, the apparatus further includes a reporting module, configured to report a core network parameter value that can be met by the core network element to the data analytics network element, where the core network parameter value is used to generate the service quality analytics result.

In some possible implementations, the reporting module includes: a receiving unit, configured to receive a data report request sent by the data analytics network element, where the data report request is used to request the core network element to report a corresponding service feature parameter for generating the service quality analytics result for the target terminal device; and a reporting unit, configured to report the service feature parameter to the data analytics network element in response to the data report request.

In some possible implementations, the service feature parameter meets a first reporting condition, where the first reporting condition is determined based on a second reporting condition, and the second reporting condition is used to indicate the data analytics network element to send the service quality analytics result to the core network element when the service quality analytics result meets the second reporting condition.

In some possible implementations, the apparatus further includes an adjustment module, configured to adjust, when the core network element determines that the received service quality analytics result meets a preset condition, a network parameter value corresponding to the service quality analytics result to obtain an updated network parameter value.

In some possible implementations, the apparatus further includes: a second sending module, configured to send the updated parameter value to the data analytics network element; and a third receiving module, configured to receive an updated service quality analytics result determined by the data analytics network element based on the updated network parameter value.

In some possible implementations, the apparatus further includes a third sending module, configured to send the updated service quality analytics result to the access network element.

The communication apparatus provided in the sixth aspect corresponds to the communication method provided in the third aspect. Therefore, for various possible implementations of the communication apparatus provided in the sixth aspect, refer to the various possible implementations of the communication apparatus provided in the third aspect.

According to a seventh aspect, an embodiment of this application further provides a communication method, including: A first network element obtains, from a data analytics network element, information about a service quality analytics result for a target object; and the first network element obtains charging information of the target object based on the service quality analytics result. In the implementation, because the service quality analytics result may reflect service quality of the target object, different charging information may be generated of the target object when the service quality of the target object is different. For example, when the service quality of the target object is higher, the target object may be charged higher; when the service quality of the target object is lower, the target object may be charged lower. In this way, the first network element can charge the target object more properly, thereby improving reasonableness and reliability of charging the target object by the first network element.

In some possible implementations, that a first network element obtains, from a data analytics network element, information about a service quality analytics result for a target object includes: The first network element receives the service quality analytics result from a second network element.

In some possible implementations, that a first network element obtains, from a data analytics network element, information about a service quality analytics result for a target object includes: The first network element receives intermediate information of the service quality analytics result from a second network element. That the first network element obtains charging information of the target object based on the service quality analytics result includes: The first network element obtains the charging information of the target object based on the intermediate information.

In some possible implementations, that a first network element obtains, from a data analytics network element, information about a service quality analytics result for a target object includes: The first network element sends a first request to the data analytics network element, where the first request is used to request the data analytics network element to feed back the service quality analytics result for the target object to the first network element; and the first network element receives the service quality analytics result that is for the target object and that is sent by the data analytics network element in response to the first request. In the implementation, the first network element may request the data analytics network element for the service quality analytics result for the target object. Specifically, the first network element may obtain the service quality analytics result by sending a request. In this way, after responding to the request sent by the first network element, the data analytics network element may feed back the service quality analytics result to the first network element, so that the first network element can obtain the service quality analytics result required by the first network element. Certainly, in another possible implementation, the data analytics network element may alternatively actively report the service quality analytics request to the first network element.

In some possible implementations, the first request includes an online feedback indicator, and the online feedback indicator is used to indicate the data analytics network element to feed back the service quality analytics result for the target object online. In the implementation, because the request sent by the first network element to the data analytics network element carries the online feedback indicator, the data analytics network element may immediately execute, based on the online feedback indicator, a process of generating the service quality analytics result. Therefore, the first network element can obtain the required service quality analytics result in a short time period, thereby improving real-time performance of performing corresponding processing on the target object.

In some possible implementations, the first request includes a reporting periodicity, and the reporting periodicity is used to indicate the data analytics network element to feed back the service quality analytics result for the target object based on the reporting periodicity. In the implementation, the request sent by the first network element to the data analytics network element carries the reporting periodicity. In this way, after the first network element requests the service quality analytics result once, the data analytics network element may periodically feed back the service quality analytics result to the first network element, and the first network element may not need to obtain the service quality analytics result by sending a request each time.

In some possible implementations, the target object includes any one or more of a network, a terminal device, and a service, and the first request includes any one or more of a network identifier, a terminal device identifier, and a service identifier. In the implementation, the first network element may specifically obtain a service quality analytics result corresponding to any one or more of the network, the terminal device, and the service, to implement corresponding processing, for example, charging, on the network, the terminal device, or the service based on the service quality analytics result.

In some possible implementations, the service quality analytics result includes a service quality analytics result corresponding to preset time. In the implementation, the data analytics network element may determine, when the preset time is reached, to generate the service quality analytics result for the target object. This can effectively control an occasion for generating the service quality analytics result by the data analytics network element. For example, the preset time may indicate an occasion on which the terminal device (that is, the target object) enters a connected state. In this case, when determining that the terminal device enters the connected state, the data analytics network element may generate the service quality analytics result corresponding to the terminal device and feed back the service quality analytics result to the first network element.

In some possible implementations, the service quality analytics result is determined based on a service quality feature parameter obtained in a target time period. In the implementation, the data analytics network element may determine the service quality analytics result for the target object in the target time period. That is, in actual application, service quality of the target object in a specific time period may be determined in a manner of configuring the target time period, so that the first network element can perform a corresponding processing process based on the service quality in the time period.

In some possible implementations, the service quality analytics result includes one or more of the following analytics result types: a latency, a bandwidth, a jitter, a packet loss rate, a location, an access type, an access frequency, an amount of invoked resources, an access point name APN, a service level agreement SLA, and a mean opinion score MOS.

In some possible implementations, when the target object is a network, the service quality analytics result includes one or more of the following analytics result types: a quantity of registered users, a quantity of online users, a quantity of users corresponding to a target service level, and a quantity of users corresponding to a target service.

In some possible implementations, when the target object is a terminal device, the service quality analytics result includes one or more of the following analytics result types: a terminal device type, terminal device group information, a slice resource invoked by a user, a multi-access edge computing MEC platform invoked by a user, and a quantity of terminal devices connected to a target hotspot.

According to an eighth aspect, an embodiment of this application further provides a communication method, including: A data analytics network element receives a first request from a first network element, where the first request is used to request the data analytics network element to feed back a service quality analytics result for a target object, and the first request includes an online feedback indicator for indicating the data analytics network element to feed back the service quality analytics result online; the data analytics network element generates the service quality analytics result for the target object; and the data analytics network element feeds back the service quality analytics result to the first network element online based on the online feedback indicator in the first request. In the implementation, because the request sent by the first network element to the data analytics network element carries the online feedback indicator, the data analytics network element may immediately execute, based on the online feedback indicator, a process of generating the service quality analytics result. Therefore, the first network element can obtain the required service quality analytics result in a short time period, thereby improving real-time performance of performing corresponding processing on the target object.

In some possible implementations, that the data analytics network element generates the service quality analytics result for the target object includes: The data analytics network element sends a second request to a target network element based on the first request, where the second request is used to request the target network element to report a service quality feature parameter, and the second request includes an online reporting indicator for indicating the target network element to report the service quality feature parameter online; and the data analytics network element generates the service quality analytics result for the target object based on the service quality feature parameter reported by the target network element online. In the implementation, when determining that the first request carries the online feedback indicator, the data analytics network element may configure the online reporting indicator in the generated second request. In this way, after the data analytics network element sends the second request to the target network element, the target network element may feed back, in real time based on the online reporting indicator in the second request, the service quality feature parameter required for generating the service quality analytics result to the data analytics network element. In this way, the data analytics network element can obtain the service quality feature parameter in a short time period, and further the first network element can obtain a required service quality analytics result as soon as possible.

In some possible implementations, the service quality analytics result is used by the first network element to generate charging information of the target object based on the service quality analytics result. In the implementation, the first network element may specifically charge the target object based on the received service quality analytics result. In addition, the service quality analytics result can more accurately reflect service quality of the target object. In this way, charging the target object based on the service quality analytics result can improve reasonableness and reliability of charging the target object.

In some possible implementations, the first request further includes a reporting periodicity. The feeding back the service quality analytics result to the first network element online includes: The data analytics network element feeds back the service quality analytics result to the first network element online based on the reporting periodicity. In the implementation, the request sent by the first network element to the data analytics network element carries the reporting periodicity. In this way, after the first network element requests the service quality analytics result once, the data analytics network element may periodically feed back the service quality analytics result to the first network element, and the first network element may not need to obtain the service quality analytics result by sending a request each time.

In some possible implementations, the target object includes any one or more of a network, a terminal device, and a service, and the first request includes any one or more of a network identifier, a terminal device identifier, and a service identifier.

In some possible implementations, when the target object is a terminal device, the first request further includes a service quality threshold of the terminal device, and the method further includes: The data analytics network element determines a signal quality threshold of the terminal device based on the service quality threshold; and the data analytics network element sends a third request to an access network element, where the third request includes the signal quality threshold, and the third request is used to indicate the access network element to send a notification message to the data analytics network element when the signal quality of the terminal device is lower than the signal quality threshold.

In some possible implementations, that the data analytics network element generates the service quality analytics result for the target object includes: After the data analytics network element determines that the notification message sent by the access network element is received, the data analytics network element sends the second request to the target network element, where the second request is used to request the target network element to report the service quality feature parameter, and the second request includes the online reporting indicator for indicating the target network element to report the service quality feature parameter online; and the data analytics network element generates the service quality analytics result for the target object based on the service quality feature parameter reported by the target network element online.

In some possible implementations, the notification message includes the service quality feature parameter of the terminal device that is reported by the access network element online.

In some possible implementations, the service quality analytics result includes a service quality analytics result corresponding to preset time. In the implementation, the data analytics network element may determine, when the preset time is reached, to generate the service quality analytics result for the target object. This can effectively control an occasion for generating the service quality analytics result by the data analytics network element. For example, the preset time may indicate an occasion on which the terminal device (that is, the target object) enters a connected state. In this case, when determining that the terminal device enters the connected state, the data analytics network element may generate the service quality analytics result corresponding to the terminal device and feed back the service quality analytics result to the first network element.

In some possible implementations, the service quality analytics result is determined based on a service quality feature parameter obtained in a target time period. In the implementation, the data analytics network element may determine the service quality analytics result for the target object in the target time period. That is, in actual application, service quality of the target object in a specific time period may be determined in a manner of configuring the target time period, so that the first network element can perform a corresponding processing process based on the service quality in the time period.

In some possible implementations, the service quality analytics result includes one or more of the following analytics result types: a latency, a bandwidth, a jitter, a packet loss rate, a location, an access type, an access frequency, an amount of invoked resources, an access point name APN, a service level agreement SLA, and a mean opinion score MOS.

In some possible implementations, when the target object is a network, the service quality analytics result includes one or more of the following analytics result types: a quantity of registered users, a quantity of online users, a quantity of users corresponding to a target service level, and a quantity of users corresponding to a target service.

In some possible implementations, when the target object is a terminal device, the service quality analytics result includes one or more of the following analytics result types: a terminal device type, terminal device group information, a slice resource invoked by a user, a multi-access edge computing MEC platform invoked by a user, and a quantity of terminal devices connected to a target hotspot.

According to a ninth aspect, an embodiment of this application provides a communication apparatus, where the apparatus may be used in a first network element, and includes: a first obtaining module, configured to obtain, from a data analytics network element, a service quality analytics result for a target object; and a second obtaining module, configured to obtain charging information of the target object based on the service quality analytics result.

In some possible implementations, the first obtaining module is specifically configured to receive the service quality analytics result from a second network element.

In some possible implementations, the first obtaining module is specifically configured to receive intermediate information of the service quality analytics result from the second network element; and the second obtaining module is specifically configured to obtain the charging information of the target object based on the intermediate information.

In some possible implementations, the first obtaining module includes: a first sending unit, configured to send a first request to the data analytics network element, where the first request is used to request the data analytics network element to feed back the service quality analytics result for the target object to the first network element; and a receiving unit, configured to receive the service quality analytics result that is for the target object and that is sent by the data analytics network element in response to the first request.

In some possible implementations, the first request includes a first indication, and the first indication is used to indicate the data analytics network element to feed back the service quality analytics result for the target object online.

In some possible implementations, the first request includes a reporting periodicity, and the reporting periodicity is used to indicate the data analytics network element to feed back the service quality analytics result for the target object based on the reporting periodicity.

In some possible implementations, the target object includes any one or more of a network, a terminal device, and a service, and the first request includes any one or more of a network identifier, a terminal device identifier, and a service identifier.

In some possible implementations, the service quality analytics result includes a service quality analytics result corresponding to preset time.

In some possible implementations, the service quality analytics result is determined based on a service quality feature parameter obtained in a target time period.

In some possible implementations, the service quality analytics result includes one or more of the following analytics result types: a latency, a bandwidth, a jitter, a packet loss rate, a location, an access type, an access frequency, an amount of invoked resources, an access point name APN, a service level agreement SLA, and a mean opinion score MOS.

In some possible implementations, when the target object is a network, the service quality analytics result includes one or more of the following analytics result types: a quantity of registered users, a quantity of online users, a quantity of users corresponding to a target service level, and a quantity of users corresponding to a target service.

In some possible implementations, when the target object is a terminal device, the service quality analytics result includes one or more of the following analytics result types: a terminal device type, terminal device group information, a slice resource invoked by a user, a multi-access edge computing MEC platform invoked by a user, and a quantity of terminal devices connected to a target hotspot.

The communication apparatus provided in the ninth aspect corresponds to the communication method provided in the seventh aspect. Therefore, for various possible implementations of the communication apparatus provided in the ninth aspect, refer to the various possible implementations of the communication apparatus provided in the seventh aspect.

According to a tenth aspect, an embodiment of this application further provides an apparatus, where the apparatus is used in a data analytics network element, and includes: a receiving module, configured to receive a first request from a first network element, where the first request is used to request the data analytics network element to feed back a service quality analytics result for a target object, and the first request includes an online feedback indicator for indicating the data analytics network element to feed back the service quality analytics result online; a generation module, configured to generate the service quality analytics result for the target object; and an online feedback module, configured to feed back the service quality analytics result to the first network element online based on the online feedback indicator in the first request.

In some possible implementations, the generation module includes: a sending unit, configured to send a second request to a target network element based on the first request, where the second request is used to request the target network element to report a service quality feature parameter, and the second request includes an online reporting indicator for indicating the target network element to report the service quality feature parameter online; and a generation unit, configured to generate the service quality analytics result for the target object based on the service quality feature parameter reported by the target network element online.

In some possible implementations, the service quality analytics result is used by the first network element to generate charging information of the target object based on the service quality analytics result.

In some possible implementations, the first request further includes a reporting periodicity. The feeding back the service quality analytics result to the first network element online includes: The data analytics network element feeds back the service quality analytics result to the first network element online based on the reporting periodicity.

In some possible implementations, the target object includes any one or more of a network, a terminal device, and a service, and the first request includes any one or more of a network identifier, a terminal device identifier, and a service identifier.

In some possible implementations, the service quality analytics result includes a service quality analytics result corresponding to preset time.

In some possible implementations, the service quality analytics result is determined based on a service quality feature parameter obtained in a target time period.

In some possible implementations, the service quality analytics result includes one or more of the following analytics result types: a latency, a bandwidth, a jitter, a packet loss rate, a location, an access type, an access frequency, an amount of invoked resources, an access point name APN, a service level agreement SLA, and a mean opinion score MOS.

In some possible implementations, when the target object is a network, the service quality analytics result includes one or more of the following analytics result types: a quantity of registered users, a quantity of online users, a quantity of users corresponding to a target service level, and a quantity of users corresponding to a target service.

In some possible implementations, when the target object is a terminal device, the service quality analytics result includes one or more of the following analytics result types: a terminal device type, terminal device group information, a slice resource invoked by a user, a mobile edge computing MEC platform invoked by a user, and a quantity of terminal devices connected to a hotspot.

The communication apparatus provided in the tenth aspect corresponds to the communication method provided in the eighth aspect. Therefore, for various possible implementations of the communication apparatus provided in the tenth aspect, refer to the various possible implementations of the communication apparatus provided in the eighth aspect.

According to an eleventh aspect, an embodiment of this application further provides a device, including a processor and a memory. The processor is coupled to the memory. The memory is configured to store a computer program or instructions. The processor is configured to execute the computer program or the instructions, so that the communication method according to any implementation in the first aspect, the communication method according to any implementation in the second aspect or the third aspect, or the communication method according to any implementation in the seventh aspect or the eighth aspect is performed.

According to a twelfth aspect, an embodiment of this application further provides a data analytics network element. The data analytics network element includes a processor and an interface circuit. The interface circuit is coupled to the processor. The processor is configured to run a computer program or instructions, to implement the method according to any one of the first aspect to the third aspect or the method according to any one of the eighth aspect to the eighth aspect. The interface circuit is configured to communicate with another module outside the data analytics network element.

According to a thirteenth aspect, an embodiment of this application further provides a chip. The chip includes a processor and an interface circuit. The interface circuit is coupled to the processor. The processor is configured to run a computer program or instructions, to implement the method according to any one of the first aspect to the third aspect or the method according to either the seventh aspect or the eighth aspect. The interface circuit is configured to communicate with another module outside the chip. In actual application, the chip may be used in the foregoing access network element, to perform the method performed by the access network element; may be used in the foregoing data analytics network element, to perform the method performed by the data analytics network element; or may be used in the foregoing core network element, to perform the method performed by the core network element.

According to a fourteenth aspect, an embodiment of this application further provides a computer-readable storage medium. The computer-readable storage medium stores a program used to implement the method according to any one of the first aspect to the third aspect, the seventh aspect, and the eighth aspect. For example, when the program is run in an access network element, the access network element performs the method according to the first aspect; when the program is run in a data analytics network element, the data analytics network element performs the method according to the second aspect; when the program is run in a core network element, the core network element performs the method according to the third aspect.

According to a fifteenth aspect, an embodiment of this application provides a computer program product. The program product includes a program. When the program is run, the method according to any one of the first aspect to the third aspect, the seventh aspect, and the eighth aspect is performed.

According to a sixteenth aspect, an embodiment of this application further provides a communication system. The communication system may include the access network element according to any implementation in the first aspect and the data analytics network element according to any implementation in the second aspect, or may include the first network element according to any implementation in the seventh aspect and the data analytics network element according to any implementation in the eighth aspect.

In some possible implementations, when the communication system may include the access network element according to any implementation in the first aspect and the data analytics network element according to any implementation in the second aspect, the communication system may further include the core network element according to any implementation in the third aspect.

It can be learned from the foregoing technical solutions that, the access network element (such as a base station) may perform cell handover decision on UE based on the service quality analytics result, to improve reliability of a handover decision basis. In specific implementation, the data analytics network element may determine the service quality analytics result for the target terminal device. For example, the data analytics network element may obtain the service quality analytics result for the target terminal device by performing analytics processing on the service feature parameter related to the target terminal device. Accordingly the service quality analytics result indicates the service quality of the target terminal device, and the data analytics network element may send the service quality analytics result to the access network element, for example, may send the service quality analytics result to the access network element via the core network element. After receiving the service quality analytics result, the access network element may determine, based on the service quality analytics result, whether to hand over the target terminal device. It may be understood that the service quality analytics result may reflect the service quality of the target terminal device. When the service quality analytics result indicates that the service quality of the target terminal device is low and does not meet a service use requirement of the target terminal device, it indicates that currently there is a necessity to improve the service quality of the target terminal device by switching the cell in which the target terminal device is located. In this case, the access network element performs cell handover decision on the target terminal device based on the service quality analytics result, to improve reliability of a handover decision basis.

BRIEF DESCRIPTION OF DRAWINGS

To describe technical solutions in embodiments of this application more clearly, the following briefly describes the accompanying drawings for describing embodiments. It is clear that the accompanying drawings in the following description show merely some embodiments of this application, and a person of ordinary skill in the art may derive other drawings from these accompanying drawings.

DESCRIPTION OF EMBODIMENTS

Figure 1A:
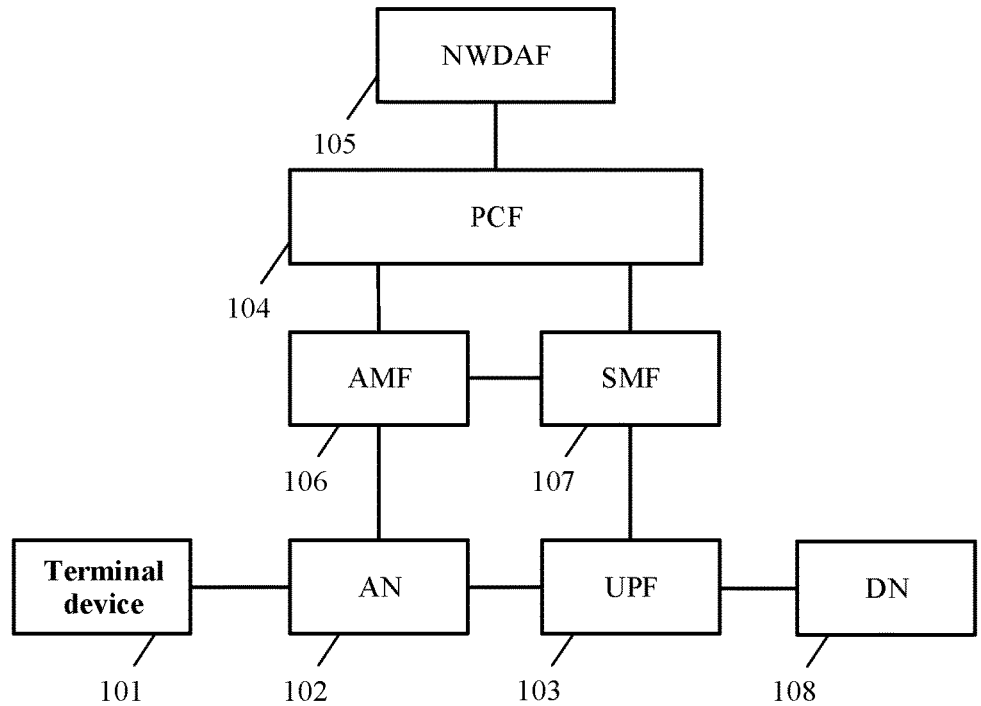
FIG. 1a is a block diagram of an example communication system according to an embodiment.

In a process in which UE accesses a network and performs wireless communication with the network, to optimally enable the UE to be located in a cell with good signal quality, an access network element such as a base station usually hands over the UE to a cell with good signal quality when signal quality of a cell in which the UE is located is poor so that the UE can be provided with services in the cell with good signal quality. In some implementations, a base station is used as an example. The base station requires the UE to report a measurement report. In addition, when the base station determines, based on the measurement report, that signal quality of a cell (which may also be referred to as a local cell) in which the UE is currently located is lower than a preset handover threshold and signal quality of a neighboring cell of the local cell is higher than the preset handover threshold, the base station determines to hand over the UE from the current cell to the neighboring cell.

However, the prior art has the following disadvantages: Through research that it is usually arbitrary that the access network element performs cell handover decision on the UE based on a pre-configured fixed handover threshold. In an actual application scenario, even if the UE is located in a cell with high signal quality, service quality of the UE is not necessarily high. Correspondingly, when the UE is located in a cell with low signal quality, the service quality of the UE is not necessarily low. Therefore, the measurement report based on which the access network element performs cell handover decision on the UE is unreliable. In other words, after the access network element performs cell handover decision on the UE based on cell signal quality reflected in the measurement report, the service quality of the UE may not be improved, or even the service quality may be degraded. For example, a data download speed becomes slower, or a browser page does not respond for a long time.

In view of this, embodiments of this application provide a communication method in which an access network element (for example, a base station) may perform cell handover decision on a terminal device such as UE based on a service quality analytics result, to improve reliability of a handover decision basis. In an implementation, a data analytics network element may determine a service quality analytics result for a target terminal device. For example, the data analytics network element may obtain the service quality analytics result for the target terminal device by performing analytics processing on a service feature parameter related to the target terminal device. Accordingly, the service quality analytics result indicates service quality of the target terminal device, and the data analytics network element may send the service quality analytics result to the access network element, for example, may send the service quality analytics result to the access network element via a core network element. After receiving the service quality analytics result, the access network element may perform handover decision on the target terminal device based on the service quality analytics result. It may be understood that the service quality analytics result may reflect the service quality of the target terminal device. When the service quality analytics result indicates that the service quality of the target terminal device is low and does not meet a service use requirement of the target terminal device, it indicates that currently there is a necessity to improve the service quality of the target terminal device by switching a cell in which the target terminal device is located. In this case, the access network element performs cell handover decision on the target terminal device based on the service quality analytics result, to improve reliability of a handover decision basis.

In actual application, embodiments may be applied to an example communication system shown in FIG. 1a. The communication system may be a communication system that supports a fourth generation (4G) access technology, for example, a long term evolution (LTE) access technology. Alternatively, the communication system may be a communication system that supports a fifth generation (5G) access technology, for example, a new radio (NR) access technology. Alternatively, the communication system may be a communication system that supports a third generation (3G) access technology, for example, a universal mobile telecommunications system (UMTS) access technology. Alternatively, the communication system may be a communication system that supports a plurality of radio technologies, for example, a communication system that supports an LTE technology and an NR technology. In addition, the communication system is also applicable to a future-oriented communication technology.

In the communication system such as that depicted in FIG. 1, a terminal device 101 accesses a core network by using an access network (AN) device 102.

The terminal device 101 includes but is not limited to: a subscriber unit, a subscriber station, a mobile station, a mobile console, a remote station, a remote terminal device, a mobile terminal device, a user terminal device, a wireless communication device, a user agent, a user apparatus, a cellular phone, a cordless phone, a session initiation protocol (SIP) phone, a wireless local loop (WLL) station, a personal digital assistant (PDA), a handheld device or a computing device having a wireless communication function, a processing device, a vehicle-mounted device, or a wearable device connected to a wireless modem, a terminal device, a home appliance, or a virtual reality device in the internet of things, a terminal device in a future 5G network, a terminal device in a future evolved public land mobile network (PLMN), or the like.

The access network element 102 may be a network element that communicates with the terminal device 101. The access network element may provide communication coverage for a specific geographical area, and may communicate with user equipment within the coverage area (cell). The access network element 102 may communicate with any quantity of terminal devices. There may be a plurality of air interface connections between the access network element 102 and the terminal device 101. For example, there are two air interface connections between the access network element 102 and the terminal device 101, and the two air interface connections are respectively used to transmit a data flow A and a data flow B. The access network element may support communication protocols in different standards, or may support different communication modes. For example, the access network element 102 may be an evolved NodeB (eNodeB), a wireless fidelity access point (Wi-Fi AP), a worldwide interoperability for microwave access base station (WiMAX BS), or a radio controller in a cloud radio access network (CRAN), or the access network device may be an access network device in the future 5G network, an access network device in the future evolved PLMN, or the like.

The core network may include: a control plane function (CPF) network element, a user plane function (UPF) network element 103, a policy control function (PCF) network element 104, and an NWDAF network element 105. The control plane function network element may include an access and mobility management function (AMF) network element 106 and a session management function (SMF) network element 107. Transmission of user plane data between the terminal device 101 and a data network (DN) 108 may be implemented by using the access network element 102 and the user plane function network element 103.

The PCF network element 104 has a policy control decision function, and provides a policy for a network. The NWDAF network element 105 is used for data learning and analytics. The AMF network element 106 is used for mobility management, lawful interception, access authorization, authentication, and the like. The SMF network element 107 is configured to implement session and bearer management, address assignment, and the like. The DN 108 is a network used to transmit data. Specifically, the DN 108 may be an internet protocol (IP) multimedia subsystem (IMS) server, a packet data network (PDN), or an application server (App server).

It can be understood that in the communication system shown in FIG. 1a, functions of various composition network elements are merely an example. When the various composition network elements are applied to embodiments of this application, not all functions are necessarily required.

In the communication system, the NWDAF network element 105 may determine a service quality analytics result corresponding to the terminal device 101, and transmit the service quality analytics result to the AN network element 102 via one or more of the PCF network element 104, the SMF network element 107, the AMF network element 106, and the UPF network element 103. The AN network element 102 may perform cell handover decision on the terminal device 101 based on the received service quality analytics result. For example, when the service quality analytics result indicates that service quality of the terminal device 101 is low, the terminal device 101 may be handed over from a cell in which the terminal device 101 is currently located to a neighboring cell, to improve the service quality of the terminal device 101.

It may be understood that the foregoing scenario is merely an example of a scenario provided in embodiments of this application. Embodiments of this application may be applied to any applicable scenario, but are not limited to the foregoing scenario. For example, in another possible application scenario, there may be a direct data transmission channel between the NWDAF 105 and the AN 102, for example, a hypertext transfer protocol (HTTP) channel. In this way, the service quality analytics result determined by the NWDAF network element 105 may be directly transmitted to the AN 102 through the data transmission channel, so that the AN 102 can perform cell handover decision on the terminal device 101 based on the received service quality analytics result.

Figure 1B:
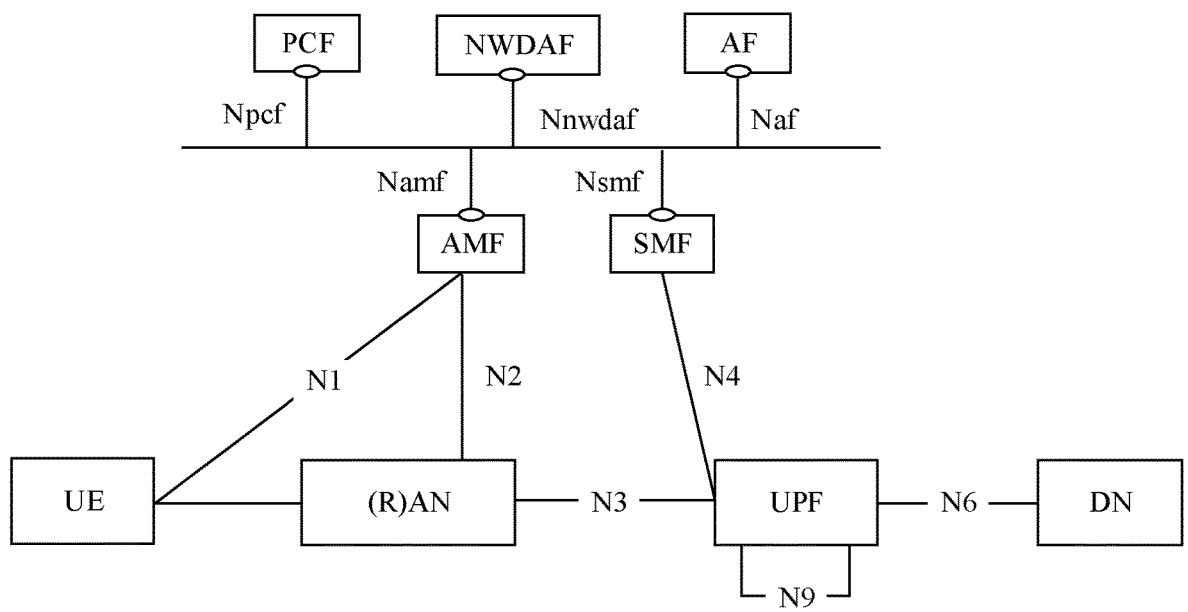
FIG. 1b is a block diagram of another example communication system according to an embodiment.

Alternatively, embodiments of this application may be applied to an example communication system shown in FIG. 1b. In the communication system, corresponding service interfaces or point-to-point interfaces may be used for communication between UE and a network element or between different network elements. For example, the UE may communicate with an AMF network element through an N1 interface, and an AN may communicate with a UPF network element through an N3 interface (similar to point-to-point interfaces such as N2, N4, N6, and N9). For another example, an AMF network element may communicate with another network element in a network through a service interface Namf interface, and an AF network element may communicate with another network element through a service interface Naf interface.

Various non-limiting specific implementations of a communication method in embodiments of this application are described in detail below with reference to the accompanying drawings.

Figure 2:
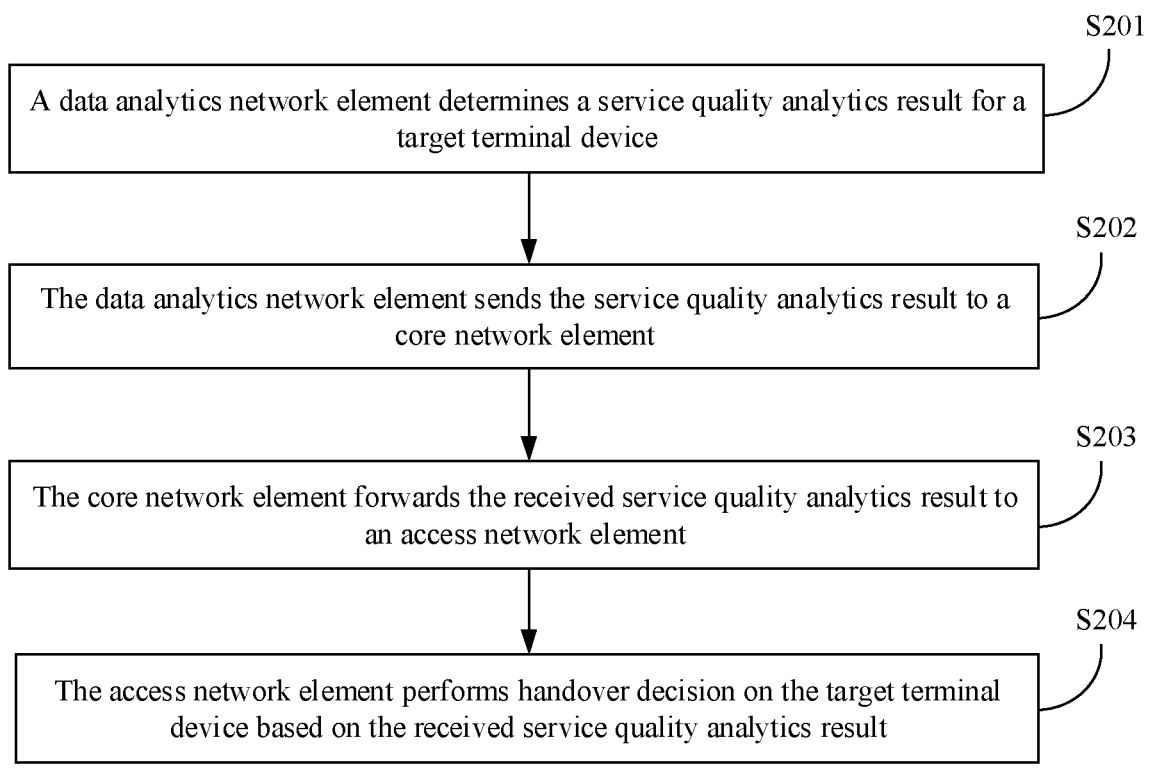
FIG. 2 is a flowchart of a communication method according to an embodiment.

FIG. 2 is a flowchart of a communication method according to an embodiment of this application. The communication method described in this embodiment may be applied to the communication system shown in FIG. 1a (or FIG. 1b). In this embodiment, a data analytics network element may be the NWDAF network element 105 in the communication system shown in FIG. 1a; a core network element may include one or more of the PCF network element 104, the SMF network element 107, the AMF network element 106, and the UPF network element 103 shown in FIG. 1a; an access network element may be the AN 102 shown in FIG. 1a; and a target terminal device may be the terminal device 101 shown in FIG. 1a. The method may specifically include the following steps.

S201. The data analytics network element determines a service quality analytics result for the target terminal device.

In this embodiment, cell or network handover decision may be performed on a specific terminal device (which is referred to as the target terminal device below, and may be, for example, UE). A decision basis for performing cell or network element handover decision on the target terminal device may be the service quality analytics result for the target terminal device, and the service quality analytics result may be determined by a network element having a data analytics function, for example, an NWDAF network element. In an example, the determined service quality analytics result may indicate service quality of the target terminal device by using a numeric value. For example, the service quality of the target terminal device may be represented by using a numeric value from 1 to 5, where the value 1 may indicate worst service quality, the value 5 may indicate highest service quality, and a larger value indicates higher service quality of the target terminal device. Alternatively, the service quality of the target terminal device may be represented by using a rank, for example, rank values such as "high", "fairly high", "medium", "fairly low", and "low" that indicate service quality in descending order. In other possible implementations, the service quality analytics result may alternatively be a service-level agreement (SLA), a mean opinion score (MOS), a latency, a bandwidth, a jitter, a packet loss rate, a terminal device location, a place in which a terminal device is located when the terminal device performs a service, or the like.

In some implementations in actual application, the data analytics network element may perform, in response to a service quality analytics request sent by another network element, the process of determining the service quality analytics result. In an example, the access network element may generate the service quality analytics request, and send the service quality analytics request to the data analytics network element, to request the service quality analytics result from the data analytics network element. In this way, the data analytics network element may respond to the received service quality analytics request, and obtain the service quality analytics result by performing corresponding analytics processing on service feature parameters. In this embodiment, the access network element may send the service quality analytics request to the core network element, and then the core network element forwards the service quality analytics request to the data analytics network element. Certainly, in an implementation other than this embodiment, the access network element may alternatively directly send the service quality analytics request to the data analytics network element through a pre-established specific data transmission channel such as an HTTP channel, with no need of forwarding by the core network element.

In some non-limiting examples, when receiving a measurement report reported by the target terminal device, the access network element may send the service quality analytics request for the target terminal device to the data analytics network element. The target terminal device may report the measurement report in response to a radio resource control (radio resource control, RRC) connection reconfiguration message delivered by the access network element. The RRC connection reconfiguration message may carry measurement configuration information, and the measurement configuration information may be used to notify the target terminal device of an object (for example, a frequency in a list of intra-RAT neighboring cells) that needs to be measured, a measurement trigger condition (for example, when signal quality of a local cell is lower than a threshold), and a measurement report reporting condition (for example, when signal quality of a neighboring cell is higher than a threshold). Alternatively, the access network element may determine, based on signal quality indicated in the received measurement report, whether to send the service quality analytics request. Specifically, after receiving the measurement report reported by the target terminal device, the access network element may first determine whether signal quality, indicated in the measurement report, of a cell in which the target terminal device is located meets a corresponding preset condition (which is referred to as a third preset condition below for ease of distinguishing from the following preset conditions). If determining that the signal quality of the local cell meets the third preset condition, for example, reference signal received power (reference signal received power, RSRP) of the local cell is −115 dB, which is lower than a preset threshold −110 dB, the access network element may send the service quality analytics request for the target terminal device to the data analytics network element. The signal quality of the cell may be represented by using RSRP and/or reference signal received quality (reference signal received quality, RSRQ) measured by the target terminal device.

In other possible implementations, alternatively, the core network element (for example, the PCF network element 104 in FIG. 1a) may generate the service quality analytics request, and directly send the service quality analytics request to the data analytics network element. For example, when the target terminal device is currently performing an online service such as a voice service, the core network element may generate the service quality analytics request during service establishment, or may periodically generate the service quality analytics request, and request the service quality analytics result corresponding to the target terminal device from the data analytics network element by using the service quality analytics request.

Further, after receiving the service quality analytics request, the data analytics network element may respond to the service quality analytics request, and obtain corresponding service feature parameters that are in a network and that are used to generate the service quality analytics result. For example, the data analytics network element may initiate a data subscription request to the access network element and/or the core network element, to request the access network element and/or the core network element to report the corresponding service feature parameters. The service feature parameters may be data related to a service of the target terminal device, or may be data that affects or reflects the service quality of the target terminal device, for example, data such as a network bandwidth allocated to the target terminal device or a packet loss rate of service data of the target terminal device in a transmission process. Then, the data analytics network element may perform analytics processing on the obtained service feature parameters, to obtain the service quality analytics result that can reflect the service quality of the target terminal device.

In an example of a specific implementation, the service feature parameters may be carried in the service quality analytics request. Specifically, the service feature parameters obtained by the data analytics network element may include an access network parameter value that can be met by the access network element, for example, may include a parameter measurement value (for example, a downlink data transmission speed) observed by the access network element for the target terminal device or a parameter value (for example, a downlink data transmission speed that can be ensured) that can be met by the access network element. When the service quality analytics request is generated by the access network element, the access network element may generate the service quality analytics request including the access network parameter value, and send the access network parameter value together with the service quality analytics request to the data analytics network element.

In addition, the service feature parameters obtained by the data analytics network element may further include a core network parameter value that can be met by the core network element, for example, parameter measurement values that are observed by network elements such as an AMF network element, an SMF network element, a PCF network element, and an AF network element for the target terminal device or parameter values that can be met by the network elements. When the service quality analytics request is generated by the core network element, the core network element may generate the service quality analytics request including the core network parameter value, and send the core network parameter value together with the service quality analytics request to the data analytics network element. When the service quality analytics request is generated by the access network element, after receiving the service quality analytics request sent by the access network element, the core network element may add the core network parameter value to the service quality analytics request, and send the service quality analytics request including the core network parameter value to the data analytics network element.

In the foregoing implementation, the service feature parameters may be sent to the data analytics network element together with the service quality analytics request. In other possible implementations, alternatively, the data analytics network element may require the access network element and/or the core network element to report the service feature parameters. In specific implementation, after receiving the service quality analytics request, the data analytics network element may actively send a first data report request to the access network element to request the access network element to report the access network parameter value to the data analytics network element, and/or actively send a second data report request to the core network element to request the core network element to report the core network parameter value to the data analytics network element, so that the data analytics network element can obtain the service feature parameters required for generating the service quality analytics result.

Further, after obtaining the service feature parameter, the data analytics network element may obtain the corresponding service quality analytics result by using a pre-trained service quality analytics model. Specifically, the service quality analytics model may be constructed in advance by using a method such as big data analytics or machine learning, and the service quality analytics model is trained by using at least one group of sample data, where the sample data includes sample service feature parameters used as model input and a sample service quality analytics result used as model output, to obtain a function relationship between the sample service feature parameters and the sample service quality analytics result. The sample service feature parameters may be specifically a parameter such as time, a location, weather, and network load corresponding to a service, and may be obtained through measurement by the access network element or the core network element. After training of the service quality analytics model is completed, the data analytics network element may input the obtained service feature parameters into the service quality analytics model, and perform analytics by using the service quality analytics model to obtain the corresponding service quality analytics result.

It should be noted that, in this embodiment, a service quality analytics result corresponding to each terminal device may be determined for the terminal device. Service quality analytics results corresponding to different terminal devices may be different. For example, for a first terminal device and a second terminal device that are wirelessly connected to a base station, a service quality analytics result corresponding to the first terminal device may indicate that current service quality of the first terminal device is poorer, and a service quality analytics result corresponding to the second terminal device indicates that current service quality of the second terminal device is better.

In actual application, the service quality analytics result determined by the data analytics network element for the target terminal device may be specifically a service quality analytics result for an online service. It may be understood that, for an online service of the target terminal device, that is, a service currently performed by the target terminal device, to maintain service experience of the terminal device at an as high level as possible, when the service quality of the target terminal device is low, the service quality of the target terminal device may be improved by performing cell handover on the target terminal device. Therefore, the data analytics network element may determine the service quality analytics result for the online service for the target terminal device, so that the access network element can determine, based on service quality of the online service of the target terminal device, whether to perform cell handover on the target terminal device.

Certainly, the data analytics network element may feed back the service quality analytics result to the access network element online, that is, when the access network element requests the service quality analytics result from the data analytics network element, the data analytics network element can feed back the service quality analytics result in real time (in a time period as short as possible), so that the access network element can obtain the required service quality analytics result quickly. Further, the service quality analytics request sent by the access network element to the data analytics network element may carry an online feedback indicator, so that the data analytics network element can quickly feed back the service quality analytics result based on the online feedback indicator.

Accordingly, in this embodiment, indication information may be used to indicate the data analytics network element to determine the service quality analytics result corresponding to the online service of the target terminal device. In an example of a specific implementation, the service quality analytics request received by the data analytics network element may include second indication information, and the second indication information may be used to indicate to request the service quality analytics result corresponding to the online service of the target terminal device. The second indication information may be added by the access network element or the core network element to the service quality analytics request. For example, when requesting the service quality analytics result for the target terminal device from the data analytics network element, the access network element may first determine specific online services currently performed by the target terminal device, generate corresponding second indication information based on the determined online services, and then add the second indication information to the service quality analytics request, so that the second indication information is sent to the data analytics network element together with the service quality analytics request. Certainly, the second indication information and the service quality analytics request may alternatively be separately sent to the data analytics network element. In this embodiment, a specific implementation in which the data analytics network element obtains the second indication information from another network element is not limited.

It should be noted that, when obtaining no special indication, the data analytics network element may alternatively generate the service quality analytics result for the online service of the target terminal device by default. Therefore, after generating the service quality analytics result, the data analytics network element may further generate first indication information, where the first indication information is used to indicate that the service quality analytics result is the service quality analytics result corresponding to the online service of the target terminal device. In this way, when receiving the first indication information, the access network element may clearly determine that the received service quality analytics result corresponds to the online service of the target terminal device, instead of an offline service or a service of another type.

In addition, in some actual application scenarios, the access network element and the core network element may provide the target terminal device with a plurality of services at the same time. For example, the target terminal device may currently perform a voice service, a picture download service, and the like. Accordingly the service quality analytics result determined by the data analytics network element may be an analytics result for overall service quality of all services of the target terminal device, or may be an analytics result for service quality of a specific service of the target terminal device, for example, an analytics result for service quality of a voice service of the target terminal device.

Certainly, before determining the service quality analytics result for the target terminal device, the data analytics network element may pre-establish a corresponding service for the target terminal device. For example, when the target terminal device starts a game service, a service server in the network may send a service establishment request to the core network element, to request the core network element to establish a service for the target terminal device and establish a corresponding data transmission channel for the service of the target terminal device.

S202. The data analytics network element sends the service quality analytics result to the core network element.

The technical solution in this embodiment of this application is described by using an example in which the technical solution is applied to the communication system shown in FIG. 1a. Based on this, after determining the service quality analytics result, the data analytics network element may send the service quality analytics result to the core network element, so that the core network element can forward the service quality analytics result to the access network element.

Certainly, in other embodiments, the data analytics network element may perform direct data communication with the access network element, for example, may perform direct communication based on a data transmission channel such as an HTTP channel. In this case, the data analytics network element may directly send the service quality analytics result to the access network element based on the pre-established data transmission channel.

S203. The core network element forwards the received service quality analytics result to the access network element.

S204. The access network element performs handover decision on the target terminal device based on the received service quality analytics result.

In specific implementation, when determining that the received service quality analytics result meets a first preset condition, the access network element may determine that the target terminal device needs to be handed over from the cell (that is, a local cell) in which the target terminal device is currently located to another cell, to expect that the service quality of the target terminal device can be improved after the target terminal device is handed over to the another cell. In an example, the first preset condition may be that the service quality analytics result received by the access network element indicates that the service quality of the target terminal device is low, for example, the service quality analytics result is 2 points (where the full score is 5 points), or a service quality level indicated by the service quality analytics result is "low". Certainly, when the access network element determines that the service quality analytics result does not meet the first preset condition, the target terminal device may continue to be located in the local cell, and cell handover may not need to be performed on the target terminal device.

In another possible specific implementation, the access network element may determine, based on both the received service quality analytics result and the measurement report reported by the target terminal device, whether to perform cell handover on the target terminal device. Specifically, when determining that the received service quality analytics result meets the first preset condition, the access network element further determines, based on the measurement report reported by the target terminal device, that the signal quality of the cell in which the target terminal device is located meets a second preset condition. In this case, the access network element may determine to perform cell handover on the target terminal device. In an example, the second preset condition may be specifically that the signal quality of the cell in which the target terminal device is located is lower than a preset threshold. For example, RSRP measured by the target terminal device is lower than −120 dB. It should be noted that, in the implementation, after the access network element determines to perform cell handover on the target terminal device, the access network element may determine, based on the signal quality measurement result that is on the target terminal device for the neighboring cell and that is indicated in the measurement report, a specific neighboring cell to which the target terminal device needs to be handed over, where signal quality of the neighboring cell to which the target terminal device needs to be handed over is higher. Accordingly when the access network element determines that the service quality analytics result does not meet the first preset condition, or the cell signal quality indicated in the measurement report does not meet the second preset condition, the access network element may not perform cell handover on the target terminal device.

In still another possible specific implementation, because the target terminal device may perform a plurality of services at a current moment, such as a real-time voice service and a game service, when the target terminal device is located in the local cell, service quality of different services of the target terminal device may be different. For example, service quality of the real-time voice service is higher (for example, a call is smooth without frame freezing), and service quality of the game service is lower (for example, a user operation response latency is relatively long with frame freezing). Therefore, in this embodiment, the access network element may perform handover decision on the target terminal device based on importance of the services performed by the target terminal device. Specifically, the service quality analytics result determined by the data analytics network element may include service quality analytics results corresponding to a plurality of services. For example, the service quality analytics result includes a first service quality analytics result and a second service quality analytics result. The first service quality analytics result and the second service quality analytics result correspond to different service types. Therefore, the access network element may determine priority information corresponding to the first service quality analytics result and priority information corresponding to the second service quality analytics result, and then perform handover decision on the target terminal device based on the first service quality analytics result, the priority information corresponding to the first service quality analytics result, the second service quality analytics result, and the priority information corresponding to the second service quality analytics result. In an example, if a priority indicated by the priority information corresponding to the first service quality analytics result is higher than a priority indicated by the priority information corresponding to the second service quality analytics result, the access network element may determine, based on service quality indicated by the first service quality analytics result, whether to perform cell handover on the target terminal device. On the contrary, if the priority indicated by the priority information corresponding to the second service quality analytics result is higher, the access network element may perform cell handover decision on the target terminal device based on the second service quality analytics result.

The priority information may be configured in the access network element, or may be delivered by the core network element to the access network element, for example, by a PCF network element or an SMF network element in the core network element. In this way, after receiving the service quality analytics result, the access network element may directly obtain corresponding priority information.

It should be noted that the service quality analytics result may include service quality analytics results corresponding to a plurality of service types, and may also include service quality analytics results corresponding to a plurality of data transmission channels. That is, the priority information may not only correspond to different service types, for example, a priority of a game service and a priority of a real-time voice service, but also correspond to different data transmission channels. For example, that a priority of a data transmission channel 1 is higher than a priority of a data transmission channel 2 may be preset. In a 4G communication network, a data transmission channel may be a bearer. In a 5G communication network, a data transmission channel may be a quality of service flow (QoS flow).

In some possible implementations, the service quality of the target terminal device may be improved by adjusting a network parameter. For example, when the service quality of the target terminal device is low, the core network element (for example, a PCF) may adjust a resource parameter such as a bandwidth allocated to the target terminal device. Therefore, after receiving the service quality analytics result sent by the data analytics network element, the core network element may determine whether the service quality analytics result meets a fourth preset condition. For example, the fourth preset condition may be that the service quality of the target terminal device indicated by the service quality analytics result is low. If yes, the core network element may adjust a network parameter value corresponding to the service quality analytics result. For example, the core network element may increase a QoS parameter such as a bandwidth of the target terminal device.

Further, the service feature parameters required for generating the service quality analytics result by the data analytics network element may include a network parameter value for the target terminal device in the network. Therefore, before the core network element actually indicates the access network element to adjust the network parameter value, the core network element may send an adjusted network parameter value (which is actually not adjusted by the access network element, and is referred to as an updated network parameter value below) to the data analytics network element, and the data analytics network element performs analytics based on the updated network parameter value to obtain an updated service quality analytics result, and sends the updated service quality analytics result to the core network element.

It may be understood that, if the updated service quality analytics result indicates that the service quality of the target terminal device is high, it indicates that after the core network element indicates the access network element to adjust the current network parameter value to the foregoing updated network parameter value, the service quality of the target terminal device may be improved to a level that meets an actual use requirement of the target terminal device. In this way, after the core network element actually indicates the access network element to adjust the current network parameter value based on the updated network parameter value, because the service quality of the target terminal device can be improved, the access network element may not need to perform cell handover on the target terminal device, thereby reducing a quantity of cell handover times of the target terminal device as many as possible.

If the updated service quality analytics result indicates that the service quality of the target terminal device is low, it indicates that after the core network element indicates the access network element to adjust the network parameter value, if the service quality of the target terminal device is still not improved or is not improved to a level that meets the actual use requirement of the target terminal device, the core network element may further improve the network parameter value to determine a proper network parameter value, or send the original service quality analytics result to the access network element, so that the access network element can perform cell handover on the target terminal device.

The service quality analytics result or the updated service quality analytics result received by the core network element may be sent to the access network element, so that the access network element can determine whether to perform cell handover decision on the target terminal device.

In addition, in this embodiment, the data analytics network element may report the service quality analytics result to the access network element only when the service quality analytics result meets a second reporting condition, where the second reporting condition may be sent by the base station or the core network element to the data analytics network element. For example, the data analytics network element may report the service quality analytics result to the access network element only when a value of the service quality analytics result is lower than a reporting threshold. It may be understood that, when the service quality analytics result indicates that the service quality of the target terminal device is low, the data analytics network element may notify, based on the service quality analytics result, the access network element to perform cell handover on the target terminal device. When the service quality analytics result indicates that the service quality of the target terminal device is high, the data analytics network element may not send the service quality analytics result to the access network element, to reduce a quantity of times of data exchange between devices in the network. Especially, when the access network element or the core network element periodically subscribes to the service quality analytics result from the data analytics network element, the service quality of the target terminal device is high in most time periods. Accordingly in the time periods, the access network element may not perform cell handover on the target terminal device. In this case, the data analytics network element does not feed back the service quality analytics result when service quality of a user is high. This can effectively reduce a quantity of times of data exchange between devices in the network, and reduce resource consumption.

In other possible implementations, alternatively, resources consumed during data transmission may be reduced by reducing an amount of data reported by each network element. Specifically, the data analytics network element may obtain corresponding service feature parameters from a network element such as the access network element, the core network element, and an AF network element in the network. In this process, the data analytics network element may deliver a corresponding first reporting condition to each network element. When a service feature parameter measured or met by each network element meets the corresponding first reporting condition, the network element may report the service feature parameter to the data analytics network element, so that the data analytics network element generates a service quality analytics result. When a service feature parameter measured or met by each network element does not meet a corresponding first reporting condition, the network element may not report the service feature parameter.

It may be understood that, when the service quality of the target terminal device is low, service feature parameters (which may also be referred to as service quality influencing factors) that correspond to the service quality of the target terminal device and that are measured or can be met by some network elements may lower the service quality of the target terminal device, but service feature parameters on other network elements do not lower the service quality of the target terminal device. Therefore, the data analytics network element may receive only service feature data (that is, data that meets the first reporting condition) that is uploaded by the some network elements and that lowers the service quality of the target terminal device, to perform analytics processing on the data to obtain the service quality analytics result for the target terminal device. For example, when reporting a measurement value of an uplink data transmission rate of the target terminal device to the data analytics network element, if the access network element determines that the uplink data transmission rate is lower than a preset transmission rate (meeting the first reporting condition), it indicates that the uplink data transmission rate lowers the service quality of the target terminal device, and the access network element may report the uplink data transmission rate to the data analytics network element. Otherwise, if the access network element determines that the uplink data transmission rate is lower than the preset transmission rate, it indicates that the uplink data transmission rate does not lower the service quality of the target terminal device, and the uplink data transmission rate may not be reported. In this way, when the service quality of the target terminal device is effectively analyzed, an amount of transmitted data can be further reduced, so that impact of a service quality analytics process on the network can be reduced as much as possible.

In further possible implementations, the first reporting condition that needs to be met when each network element reports the service feature parameter may be preconfigured by the data analytics network element or determined based on the second reporting condition sent by the access network element or the core network element. For example, assuming that the core network element indicates the data analytics network element to send the service quality analytics result to the access network element when the value of the service quality analytics result is lower than 3, the data analytics network element may calculate, based on the value 3, a reporting condition that needs to be met when each network element reports a service feature parameter. For example, the data analytics network element may determine, based on the value 3, that an uplink data transmission rate of the target terminal device reported by the access network element is not higher than 300 Kbps (kbit/s or kbps).

In this embodiment, the data analytics network element may determine the service quality analytics result for the target terminal device. For example, the data analytics network element may obtain the service quality analytics result for the target terminal device by performing analytics processing on the service feature parameters related to the target terminal device. Accordingly the service quality analytics result indicates the service quality of the target terminal device, and the data analytics network element may send the service quality analytics result to the access network element. After receiving the service quality analytics result, the access network element may determine, based on the service quality analytics result, whether to perform handover decision on the target terminal device. It may be understood that the service quality analytics result may reflect the service quality of the target terminal device. When the service quality analytics result indicates that the service quality of the target terminal device is low and does not meet a service use requirement of the target terminal device, it indicates that currently there is a necessity to improve the service quality of the target terminal device by switching the cell in which the target terminal device is located. In this case, the access network element performs cell handover decision on the target terminal device based on the service quality analytics result, to improve reliability of a handover decision basis.

Figure 3:
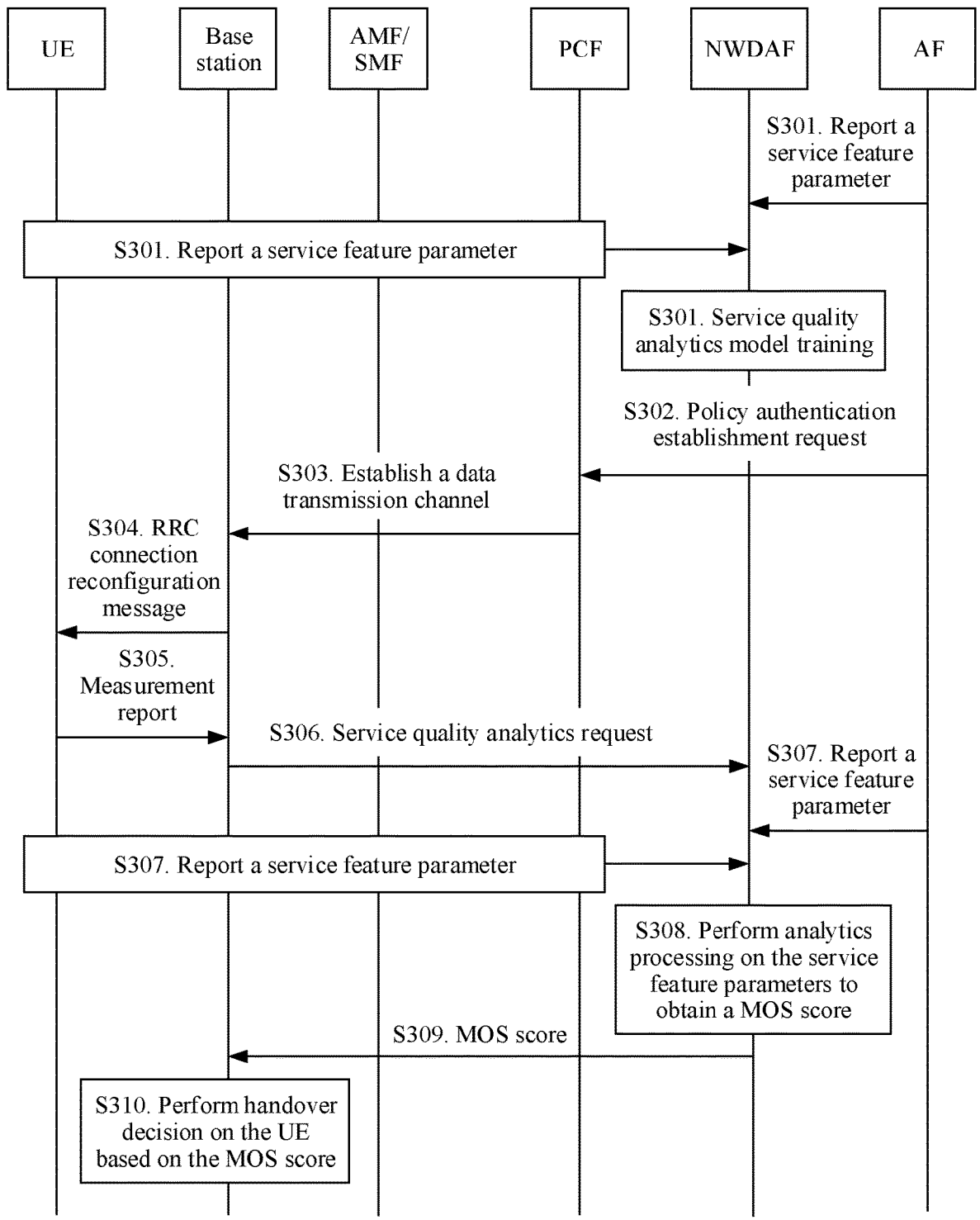
FIG. 3 is a signaling exchange diagram according to an embodiment.

For ease of understanding, the following describes technical solutions in embodiments of this application by using examples with reference to specific scenarios. FIG. 3 is a diagram of signaling exchange in a communication method according to an embodiment of this application. In this embodiment, a target terminal device is specifically UE, an access network element may be specifically a base station, core network elements may include an AMF, an SMF, a PCF, and an AF, and a data analytics network element may be specifically an NWDAF. In addition, a service quality analytics result in this embodiment may be specifically a mean opinion score (mean opinion score, MOS) score. The method may specifically include the following steps.

S301. The NWDAF obtains service feature parameters for the UE on the UE, the base station, and each core network element in advance, and obtains a service quality analytics model through training based on the obtained service feature parameters.

In this embodiment, the NWDAF may collect, in advance, sample data used for model training, and obtain a service quality analytics model through training based on the obtained sample data. The service quality analytics model may output a corresponding service quality analytics result based on the input service feature parameters. In this embodiment, the service quality analytics result may be specifically represented by using a MOS score.

In specific implementation, the service quality analytics model may be constructed in advance by using a method such as big data analytics or machine learning, and the service quality analytics model is trained by using the sample data obtained from the UE, the base station, and each core network element. The sample data includes sample service feature parameters used as model input and a sample MOS score used as model output, to obtain a function relationship between the sample service feature parameters and the sample MOS score. The sample service feature parameters may be specifically a parameter such as time, a location, weather, and network load corresponding to a service. It should be noted that, when the service quality analytics model is trained, used sample data may be service feature data of services of one or more UEs and corresponding service quality scores. When a service quality analytics result for specific UE is determined by using the trained service quality analytics model, service feature data input into the service quality analytics model may be service feature data of single UE.

S302. The AF sends a policy authentication establishment request to a PCF, to trigger establishment of a data transmission channel for a corresponding service of the UE.

S303. The PCF triggers, based on service description information in the policy authentication establishment request, a network side to establish the data transmission channel for the service of the UE.

In this embodiment, when the UE requests a service (for example, a voice service), a corresponding service may be established for the UE. In specific implementation, the AF may deliver the policy authentication establishment request for the UE to the PCF. The policy authentication establishment request may include at least an identifier of the UE and service description information of a service requested by the UE. The service description information may include requirement information for this service establishment, for example, information such as a bandwidth required by the service, a latency requirement, and a MOS score requirement.

In this way, the PCF may trigger, based on the received service description information, the network side SMF to establish the data transmission channel for the service requested by the user equipment, so that service data of the user equipment can be transmitted between network elements based on the data transmission channel.

In specific implementation, when this embodiment is applied to a 5G scenario, the PCF may trigger a PDU session modification procedure. In the procedure, the network side may establish a dedicated quality of service flow (QoS flow), where the QoS flow is the foregoing data transmission channel, and may be used to transmit data related to the service. When this embodiment is applied to a 4G scenario, the PCF may trigger a dedicated bearer establishment procedure, where an established bearer is the foregoing data transmission channel, and may be used to transmit data related to the service.

S304. The base station delivers an RRC connection reconfiguration message to the UE, where the RRC connection reconfiguration message includes a measurement object, a measurement trigger condition, and a reporting condition of a measurement report.

In this embodiment, the base station may indicate the UE to upload the measurement report. Specifically, the base station may deliver an RRC connection reconfiguration message to the UE, where the RRC connection reconfiguration message is used to notify the UE of an object that needs to be measured, a trigger condition for triggering the UE to measure signal quality of a neighboring cell, and a reporting condition that needs to be met when the UE reports the measurement report to the base station.

S305. When determining, based on the RRC connection reconfiguration message, that the reporting condition of the measurement report is currently met, the UE reports the measurement report to the base station.

Specifically, after receiving the RRC connection reconfiguration message, the UE may measure whether RSRP or RSRQ (signal quality) of the local cell meets a trigger condition, which may be specifically whether the RSRP or the RSRQ is lower than a preset threshold. If yes, the UE may determine a neighboring cell of the local cell based on the measurement object in the RRC connection reconfiguration message, and measure RSRP or RSRQ of the neighboring cell to obtain an RSRP or RSRQ value of the neighboring cell. Further, if the base station determines that the RSRP or RSRQ value of the neighboring cell is higher than the preset threshold, the UE may report a measurement report of the user equipment on the local cell and the neighboring cell to the base station.

S306. The base station generates a service quality analytics request for the UE based on the received measurement report, and sends the service quality analytics request to the NWDAF.

In this embodiment, when receiving the measurement report reported by the UE, the base station may be triggered to generate the service quality analytics request and send the service quality analytics request to the NWDAF. In another implementation, after receiving the measurement report, the base station may determine, based on the measurement report, whether the RSRQ or the RSRQ of the local cell meets a preset condition. If yes, the base station may be triggered to generate the service quality analytics request, and send the service quality analytics request to the NWDAF. If no, the base station may not perform cell handover on the user equipment.

Further, in a process in which the base station generates the service quality analytics request, the service feature parameters required by the NWDAF for generating the service quality analytics result may be added to the service quality analytics request, and is sent to the NWDAF together with the service quality analytics request. The service feature parameters added by the base station may be a parameter value that is measured or can be met by the base station, for example, a measurement value that is of an uplink signal of the user equipment and that is observed by the base station. Certainly, the service feature parameters added by the base station may alternatively be measurement data (for example, an actual measurement value of RSRP or RSRQ) in the measurement report reported by the UE, or a numeric result obtained after the base station performs intermediate processing on the measurement data may be used to represent the parameter value that can be met or can be ensured by the base station currently.

It should be noted that the NWDAF provides a plurality of data processing services in actual application. For example, the NWDAF may predict a movement track of the terminal, analyze the service quality of the UE, and the like. Therefore, when requesting the NWDAF to provide a data processing service, the base station may further add an analytic identifier (analytic ID) to the service quality analytics request, so that the NWDAF determines, based on the analytic identifier, to perform service quality analytics processing on the UE.

In some actual application scenarios, if the NWDAF is deployed in a remote core network, the base station may send the service quality analytics request to the NWDAF via a control plane network function (network function, NF) network element. The NF network element may include one or more of the AMF network element, the SMF network element, and the PCF network element.

In specific implementation, the base station may send the service quality analytics request to the AMF through an N2 interface. The N2 interface is specifically a communication interface between the base station and the AMF. Then, the AMF may directly send the service quality analytics request to the NWDAF through a service-oriented interface between the AMF and the NWDAF. Alternatively, the AMF may first forward the service quality analytics request from the base station to the SMF, and then the SMF sends the service quality analytics request to the NWDAF through a service-oriented interface between the SMF and the NWDAF. Alternatively, the SMF forwards the service quality analytics request to the PCF, and then the PCF sends the service quality analytics request to the NWDAF through an interface between the PCF and the NWDAF.

It should be noted that, in a process of transmitting the service quality analytics request, each network element may add service related data obtained by the network element for the user equipment to the service quality analytics request, where the service related data may be data measured by each network element, or may be data that can be met by each network element, and is reported to the NWDAF together with the service quality analytics request, so that the NWDAF generates the corresponding service quality analytics result by analyzing the data. In an example, the AMF may report a location (location) and a mobility pattern (mobility pattern) of the UE. The SMF may report load (load) of the SMF and an uplink/downlink volume and duration (UL/DL volume and duration) of a quality of service flow. The PCF may report service requirement (service requirement) information of a service of the user equipment, and the like. In this way, after receiving the service quality analytics request, the NWDAF may not need to request these network elements to report corresponding service feature parameters, so that a quantity of times of data exchange between the NWDAF and each network element can be reduced, and a latency in obtaining the service quality analytics result by the base station can also be shortened.

Certainly, in another implementation, the NWDAF may alternatively actively send a responded data report request to each network element after receiving the service quality analytics request, to request each network element to report a corresponding service feature parameter to the NWDAF. In specific implementation, the reporting manner may be set based on an actual use requirement. This is not limited herein.

S307. In response to the received service quality analytics request, the NWDAF obtains service feature parameters corresponding to the UE.

In specific implementation, if the service quality analytics request received by the NWDAF carries the service feature parameters, the NWDAF may parse the request to obtain the required service feature parameters; if the service quality analytics request does not carry the service feature parameters or carries not all service feature parameters, the NWDAF may request a corresponding network element in the network to report a service feature parameter. For example, the NWDAF may request a UE location from the AMF, request a flow bitrate from the UPF, request an SMF load from the SMF, and request a media codec from the AF.

To reduce a data volume of the service feature parameters received by the NWDAF, in this embodiment, when reporting a corresponding service feature parameter, each network element may specify that the service feature parameter reported by each network element needs to meet a specific reporting condition. When the service feature parameter does not meet the reporting condition, the corresponding network element may not report the service feature parameter to the NWDAF. The reporting condition corresponding to each network element may be determined by a MOS score reporting condition of the NWDAF, and the MOS score reporting condition means: When a MOS score meets the reporting condition, the NWDAF reports the MOS score to the base station; when the MOS score meets the reporting condition, the NWDAF does not report the MOS score to the base station.

S308. The NWDAF performs analytics processing on the obtained service feature parameters, to obtain a MOS score corresponding to the service of the UE.

In this embodiment, the NWDAF may use the pre-constructed service quality analytics model to obtain the service quality analytics result. Specifically, the NWDAF may input the obtained service feature parameters into the service quality analytics model, and the service quality analytics model outputs the MOS score corresponding to the service.

S309. The NWDAF sends the MOS score to the base station.

In specific implementation, corresponding to the sending manner in which the base station transmits the service quality analytics request to the NWDAF, the NWDAF may send the MOS score to the base station via a control plane network function (network function, NF) network element, or may directly send the MOS score to the base station. For a specific implementation process, refer to related descriptions of the foregoing data transmission process of the service quality analytics request, and details are not described herein again.

Further, when the MOS score is transmitted to the base station via the PCF, the PCF may adjust, based on the received MOS score, a network parameter value corresponding to the service of the UE. The network parameter value affects the service quality of the UE. Specifically, when the MOS score is lower than a preset score, for example, lower than 3, the PCF may adaptively increase the network parameter value such as a QoS parameter and/or RSRP corresponding to the UE, expecting to improve the service quality of the UE by increasing the network parameter value. Before actual adjustment, the PCF may send an adjusted network parameter value (where the network parameter value in the network is actually not adjusted) to the NWDAF, request the NWDAF to regenerate a MOS score based on the adjusted network parameter value, and receive an updated MOS score sent by the NWDAF. If the updated MOS score is not lower than the preset score, the PCF may indicate the base station to perform corresponding parameter adjustment based on the adjusted network parameter value. If the updated MOS score is still lower than the preset score, the PCF may send the original MOS score to the base station, so that the base station performs cell handover decision based on the MOS score.

S310. The base station determines, based on the received MOS score, whether to perform cell handover on the UE.

In specific implementation, after receiving the MOS score, if the base station determines that the MOS score is lower than the preset score, the base station may determine that the service quality of the UE is poor, and may perform a cell handover procedure on the UE; or if the base station determines that the MOS score is not lower than the preset score, the base station may determine that no cell handover needs to be performed on the UE currently.

In actual application, the base station may further perform comprehensive determining with reference to the MOS score and the measurement report reported by the UE. For example, when the base station determines that the MOS score is lower than the preset score, and the RSRP value of the UE included in the measurement report is lower than −120 dB, the base station determines that cell handover needs to be performed on the UE; when the base station determines that the MOS score is higher than the preset score, or the RSRP value of the UE included in the measurement report is higher than −120 dB, the base station determines that cell handover may not be performed on the UE currently.

Further, the NWDAF may determine different MOS scores for different services of the UE, or determine different MOS scores for different data transmission channels corresponding to the UE. Therefore, the base station may receive at least two MOS scores sent by the NWDAF, and the at least two MOS scores correspond to different services or different data transmission channels. During cell handover decision, the base station may determine, based on priorities of services or priorities of data transmission channels, which MOS score is used to determine whether to perform cell handover on the UE. For example, using a service priority as an example, if the base station receives a MOS score corresponding to a voice service and a MOS score corresponding to a game service, the base station may determine, by querying a table or priority information delivered by the PCF, that a priority of the game service is higher than a priority of the voice service. In this way, when the MOS score of the game service is lower, even if the MOS score of the voice service is higher, the base station finally determines to perform cell handover on the UE because service quality of the game service with the higher priority is lower. When the MOS score of the game service is higher, the base station does not switch the cell in which the UE is located even if the MOS score of the voice service is lower.

Figure 4:
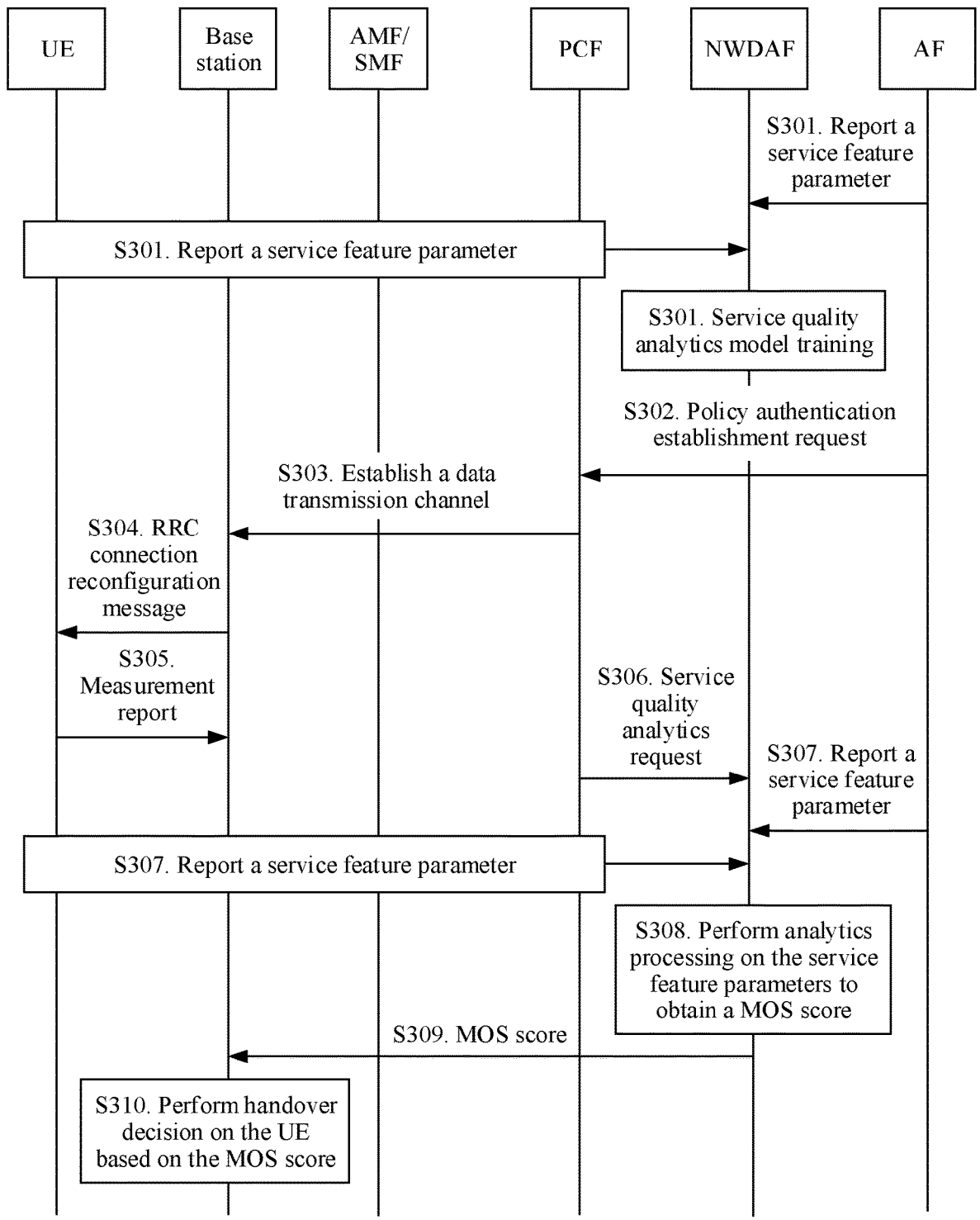
FIG. 4 is a signaling exchange diagram according to another embodiment.

It should be noted that, in the foregoing embodiment, that the base station initiates the service quality analytics request is used as an example for description. In another implementable embodiment, a network element such as the PCF may generate the service quality analytics request, and send the service quality analytics request to the NWDAF. As shown in FIG. 4, in step S306, the PCF may generate the service quality analytics request, and send the service quality analytics request to the NWDAF. In this way, after generating the MOS score, the NWDAF may notify the base station of the MOS score, so that the base station determines, based on the MOS score, whether to hand over the corresponding UE from the cell in which the corresponding UE is located.

Figure 5:
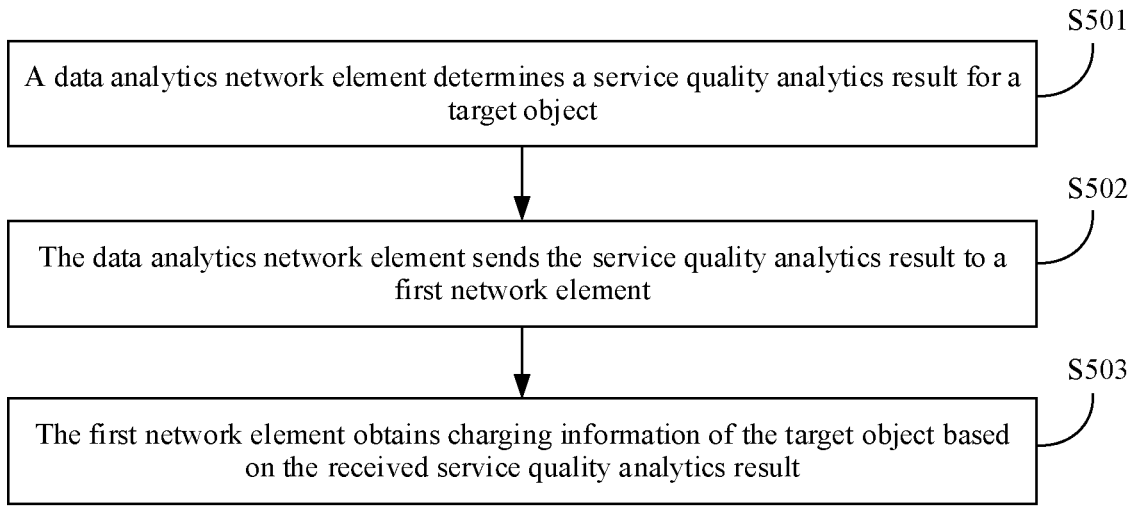
FIG. 5 is a flowchart of a communication method according to an embodiment.

FIG. 5 is a flowchart of another communication method according to an embodiment of this application. The method may specifically include the following steps.

S501. A data analytics network element determines a service quality analytics result for a target object.

In this embodiment, a first network element (for example, a charging function network element or an access network element) may perform charging or other processing (for example, cell handover decision) on a specific object (referred to as the target object below). A basis for performing processing such as charging on the target object may be the service quality analytics result corresponding to the target object, and the service quality analytics result may be determined by the data analytics network element having a data analytics function, for example, an NWDAF network element. In some possible implementations, the target object may be specifically one or more services, may be one or more terminal devices (that is, may be a single terminal device, a terminal device group, or the like), or may be one or more networks (where for example, networks in different areas are charged, and the networks may be network slices, slice instances, slice sub-instances, private networks, or public land mobile networks (PLMNs)).

In some implementations in actual application, the data analytics network element may perform, in response to a request sent by the first network element, the process of determining the service quality analytics result. In specific implementation, when the first network element needs to perform processing such as charging or handover on the target object, the first network element may generate a first request, and send the first request to the data analytics network element, to request the data analytics network element to feed back the service quality analytics result for the target object to the first network element. The first request may carry an identifier of the target object. For example, when the target object is any one or more of a network, a terminal device, and a service, the first request may include any one or more of a corresponding network identifier, terminal device identifier, and service identifier. Certainly, in actual application, the first request may alternatively not include the identifier of the target object. For example, in some examples, a target charging function network element may request a service quality analytics result for a fixed object from the data analytics network element, so that even if the first request does not carry the identifier of the target object, the data analytics network element can still determine an object for which a service quality analytics result is generated. In this embodiment, the first request may be transmitted from the first network element to the data analytics network element via a network element between the first network element and the data analytics network element (for example, a core network element or another network element in a charging system). Certainly, in another implementation, the first network element may directly send the first request to the data analytics network element through a service-oriented interface, without forwarding the first request via another network element.

In some possible implementations, the first request sent by the first network element to the data analytics network element may carry an online feedback indicator. Compared with an offline feedback, the online feedback indicator may be used to indicate the data analytics network element to feed back the service quality analytics result for the target object online (that is, in real time/immediately). In this way, the data analytics network element may generate, in response to the online feedback indicator, a second request that includes an online reporting indicator, where the online reporting indicator may be used to indicate a target network element to report service quality feature parameters corresponding to the target object online (that is, in real time/immediately), so that the data analytics network element can quickly obtain the service quality feature parameters and generate the corresponding service quality analytics result based on the service quality feature parameters. In this way, the data analytics network element can feed back the corresponding service quality analytics result to the first network element in a short time period.

Then, in response to the received first request, the data analytics network element may obtain the corresponding service quality feature parameters that are in a network and that are used to generate the service quality analytics result, and further generate the service quality analytics result for the target object. In an example, the data analytics network element may generate the second request based on the first request, and send the second request to one or more target network elements in the network, to request the target network element to report, to the data analytics network element, the service quality feature parameters corresponding to the target object. Second requests received by different target network elements may be different, and requested service quality feature parameters may also be different. For example, when the target network elements include a user plane function UPF and a base station RAN, a second request sent by the data analytics network element to the UPF may be used to request data such as a traffic bit rate of the target object, and a second request sent by the data analytics network element to the RAN may be used to request data such as an air interface latency and a maximum packet loss rate of the target object. The target network element may obtain, in response to the received second request, service quality feature parameters of the target network element that are related to the target object, and report the service quality feature parameters to the data analytics network element.

Further, the service quality feature parameters fed back by the target network element to the data analytics network element may be determined by service quality feature parameters obtained by the target network element in a specific time period. In an example of a specific implementation, the first request sent by the first network element to the data analytics network element may include a target time period, and the target time period may indicate the first network element to request a service quality analytics result corresponding to the target object in the target time period from the data analytics network element. The data analytics network element may generate, based on the first request, the second request including the target time period, and send the second request to the target network element. In this way, the target network element may collect (or observe) service quality feature parameters related to the target object in the target time period based on the target time period in the received second request, and feed back the collected (or observed) service quality feature parameters to the data analytics network element, so that the data analytics network element can generate, based on the collected (or observed) service quality feature parameters, a service quality analytics result that indicates the service quality of the target object in the target time period, and feed back the service quality analytics result to the first network element.

In this way, the data analytics network element may obtain the service quality analytics result corresponding to the target object by performing corresponding analytics processing on the received service quality feature parameters.

In this embodiment, after obtaining the service quality feature parameters, the data analytics network element may obtain the corresponding service quality analytics result by using a pre-trained service quality analytics model. Specifically, the service quality analytics model may be constructed in advance by using a method such as big data analytics or machine learning, and the service quality analytics model is trained by using at least one group of sample data, where the sample data includes sample service quality feature parameters used as model input and a sample service quality analytics result used as model output, to obtain a function relationship between the sample service quality feature parameters and the sample service quality analytics result. The sample service quality feature parameters may be specifically past service quality feature parameters. For example, the target object is a service. The sample service quality feature parameters may be specifically a parameter such as time, a place, weather, and network load corresponding to a service, and a stream bit rate, a packet loss rate, a bandwidth, and a latency that correspond to the service performed by a sample terminal device, and may be obtained through measurement by the target network element. After training of the service quality analytics model is completed, the data analytics network element may input the obtained service quality feature parameter into the service quality analytics model, and perform analytics by using the service quality analytics model to obtain the corresponding service quality analytics result. For example, the target object is a voice service of the terminal device. A voice service quality model pre-analyzed by the data analytics network element is a function relationship $h(X)$ between a voice service MOS and a service quality parameter such as a corresponding stream bit rate and RSRP of the terminal device, where X indicates a service quality parameter vector, and $h(X)$ indicates a MOS value. To obtain the voice service MOS score corresponding to the terminal device, the data analytics network element may obtain parameters such as a stream bit rate and RSRP of the target terminal device from the target network element in real time/quasi real time, and calculate the voice service MOS of the target terminal device in real time/quasi real time with reference to the function $h(X)$.

In actual application, the data analytics network element may periodically feed back the service quality analytics result for the target object to the first network element (online). For example, the data analytics network element generates the service quality analytics result for the target object every 10 minutes, and feeds back the service quality analytics result to the target charging function network element. In an example, the first request sent by the target charging function network element to the data analytics network element may include a reporting periodicity. In this way, the data analytics network element may periodically feed back the service quality analytics result to the target charging function network element based on the reporting periodicity in the first request. Certainly, in actual application, the data analytics network element may alternatively set a reporting periodicity for feeding back the service quality analytics result, and periodically report the service quality analytics result for the target object to the first network element based on the reporting periodicity set by the data analytics network element.

In addition, in some implementations, the service quality analytics result fed back by the data analytics network element may be a service quality analytics result at preset time. In an example, the first request sent by the first network element to the data analytics network element may include the preset time. In this way, when the preset time indicates a current moment, the data analytics network element may immediately obtain the corresponding service quality feature parameters from the target network element, and then may immediately feed back the service quality analytics result to the first network element. When the preset time indicates a future moment, the data analytics network element may perform, when determining that the future moment arrives, a process of generating the service quality analytics result, and feed back the corresponding service quality analytics result to the first network element. For example, the future moment may be a moment at which a terminal device enters a connected state, that is, the first network element may request the data analytics network element to feed back, when the terminal device enters the connected state, a service quality analytics result corresponding to the terminal device. For another example, the future moment may be a moment at which a terminal device performs a service, that is, the first network element may request the data analytics network element to immediately feed back a service quality analytics result corresponding to the terminal device once the terminal device uses the service.

In some possible implementations, when the target object is specifically a terminal device, the first request sent by the first network element to the data analytics network element may further include a service quality threshold of the terminal device. The service quality threshold may be used by the data analytics network element to determine a signal quality threshold of the terminal device, and the signal quality threshold may be used to perform filtering on some of the service quality feature parameters obtained by the data analytics network element. Specifically, when the signal quality of the terminal device is higher than the signal quality threshold, it indicates that the signal quality of the terminal device is high. In this case, the signal quality of the terminal device usually can ensure that the terminal device has high service quality. Therefore, the access network element may not transmit the service quality feature parameters corresponding to the terminal device to the data analytics network element, thereby reducing an amount of data obtained by the data analytics network element and reducing network overheads.

Optionally, the first request may further include a service quality threshold of the target object.

In some implementations, the service quality threshold may be a reporting threshold of the service quality analytics result specified to the data analytics network element. For example, when the service quality analytics result is specifically a MOS score, the first network element may send a MOS score reporting threshold to the data analytics network element, to specify that the data analytics network element needs to report a real-time MOS score online when the MOS score is lower than 4 points. The data analytics network element may determine a corresponding signal quality threshold, for example, RFSP-115 dB, based on the reporting threshold and the pre-generated service quality analytics model. Then, the data analytics network element may send a third request to the RAN to subscribe to the signal quality of the UE. When the signal quality of the UE is lower than the signal quality threshold, the data analytics network element is notified, so that the data analytics network element can obtain data from the target network element in real time.

In some other implementations, the service quality threshold may be used by the data analytics network element to set a reporting threshold of a service quality feature parameter. For example, the first network element may send a MOS threshold of the target object to the data analytics network element. The threshold is not necessarily a MOS score reporting threshold, but is only sent to the data analytics network element to set a reporting threshold of each service quality feature parameter. The data analytics network element determines the reporting threshold of each service quality feature parameter based on the MOS score reporting threshold and the pre-generated service quality analytics model, and sends the reporting threshold to a corresponding target network element. For example, if the data analytics network element determines that a flow bit rate threshold is 200 Mbp and that an RSRP threshold is −115 dB, the data analytics network element may send the flow bit rate threshold of 200 Mbp to the UPF, and send the RSRP threshold of −115 dB to the RAN. In the method, the target network element reports the service quality feature parameter of the UE to the data analytics network element in real time or quasi-real time only when the service quality feature parameter reaches the corresponding reporting threshold, so that the data analytics network element generates the MOS score of the UE in real time only when receiving the service quality feature parameter, thereby reducing a data volume of service quality feature data obtained by the data analytics network element in real time, reducing a data volume of the service quality analytics result reported to the first network element, and reducing overheads.

In further possible implementations, when the access network element determines to send a notification message to the data analytics network element, because the data analytics network element obtains the service quality analytics result for the terminal device based on the notification message, the access network element may collect specific data related to the terminal device, use the data as a service quality feature parameter, and send the service quality feature parameter together with the notification message to the data analytics network element. In this way, when receiving the notification message, the data analytics network element may further receive the service quality feature parameter that is required by the data analytics network element to generate the service quality analytics result. In this way, there is no need to request a corresponding service quality feature parameter from the access network element, interaction between the data analytics network element and the access network element is reduced, and network overheads are reduced. In some examples, the service quality feature parameter sent by the access network element may be specifically signal quality, a signal-to-noise ratio, or the like of the terminal device.

In this embodiment, the service quality analytics result may be specifically one or more of the following analytics result types: a latency, a bandwidth, a jitter, a packet loss rate, a location (for example, a location corresponding to a terminal device, a service, or a network slice), an access type (for example, an access type RAT corresponding to a terminal device, a service, or a network slice), an access frequency (for example, access frequency information corresponding to a terminal device, a service, or a network slice), a quantity of invoked resources (which may include, for example, a quantity of invoked air interface resources, a quantity of invoked control plane resources, a quantity of invoked user plane resources, a quantity of invoked network capability APIs, a quantity of invoked CPUs, or a quantity of invoked storage resources), an access point name (access point name, APN), a service-level agreement (service-level agreement, SLA), and a mean opinion score (mean opinion score, MOS).

In further possible implementations, when the target object is specifically a network, the service quality analytics result may be specifically one or more of the following analytics result types: a quantity of registered users, a quantity of online users, a quantity of users corresponding to a target service level, and a quantity of users corresponding to a target service. For example, the target service level may include gold service quality, silver service quality, copper service quality, and the like. When the service quality analytics result is determined, a quantity of gold users and/or a quantity of silver users included in the network may be specifically determined.

In other possible implementations, when the target object is specifically a terminal device, the service quality analytics result may specifically include one or more of the following analytics results: a terminal device type, terminal device group information, a (network) slice resource invoked by the terminal device, a mobile edge computing (mobile edge computing, MEC) platform invoked by a terminal device, a quantity of terminal devices connected to a hotspot, and the like.

S502. The data analytics network element sends the service quality analytics result to the first network element.

In this embodiment, the data analytics network element may send the service quality analytics result to the first network element via an intermediate network element (for example, a core network element or another network element in a charging system), or may directly send the service quality analytics result to the first network element through a service-oriented interface without forwarding via an intermediate network element.

In some implementations, when the data analytics network element determines that the received first request carries the online feedback indicator, the data analytics network element may feed back the service quality analytics result to the first network element online. When the first request further carries the preset time and the target time period, the data analytics network element may feed back the corresponding service quality analytics result online based on information such as the preset time and the target time period. Specifically, the data analytics network element may feed back the corresponding service quality analytics result based on an indication of information included in the first request.

S503. The first network element obtains charging information of the target object based on the received service quality analytics result.

In this embodiment, the first network element may generate the charging information of the target object based on the received service quality analytics result, for example, a detailed charging data record (charging data record, CDR) or a CDR file (CDR file), so that a corresponding charging platform or charging system may charge the target object based on the charging information.

It should be noted that the first network element may directly generate the corresponding charging information after receiving the service quality analytics result. In a possible implementation, the first network element may cooperate with another network element to charge the target object. For example, the data analytics network element may send the service quality analytics result to a second network element, and the second network element forwards the service quality analytics result to the first network element. In this way, after receiving the service quality analytics result from the second network element, the first network element may generate corresponding charging information for the target object based on the service quality analytics result. In another possible implementation in actual application, after the data analytics network element sends the service quality analytics result to a second network element, the second network element may generate intermediate information based on the service quality analytics result, where the intermediate information may be considered as another representation form of the service quality analytics result. Then, the second network element may send the intermediate information to the first network element, and the first network element generates the charging information of the target object based on the intermediate information. In an example, the first network element may be specifically any one of a CHF (charging function) network element, a CGF (charging gateway function) network element, a billing domain network element, and a CSIF (charging subscribing and interaction function) network element.

The intermediate information may be, for example, intermediate charging information such as an intermediate CDR, or may be information obtained by performing corresponding conversion on the service quality of the target object. The information is another representation form that indicates the service quality, and may be identified by the charging system. For example, when the service quality analytics result is a MOS score, the MOS score may be converted into a form such as a latency, a bandwidth, or a latency jitter, or may be converted into a form that can be understood by the charging system.

In actual application, the first network element may generate dynamic real-time charging information for the target object, in other words, perform dynamic real-time charging.

Specifically, when the first network element determines, based on the service quality analytics result, that the service quality corresponding to the target object does not reach preset service quality, the first network element may reduce charging or even not charge the target object; when the service quality corresponding to the target object reaches the preset service quality, the first network element may charge the target object according to a corresponding charging standard, and generate corresponding charging information. Certainly, in some implementations, for example, the service quality of the target object may be classified into three levels: high service quality, medium service quality, and low service quality. In addition, different rates may be used for charging for different levels of service quality. In this way, after determining, based on the service quality analytics result, the service quality corresponding to the target object, the first network element may determine a service quality level that the service quality meets, to charge the target object at a rate corresponding to the corresponding service quality level. Alternatively, in actual application, the service quality of the target object may be represented by a value, so that the target object can be charged at different rates based on service quality analytics results of different values. For example, when a value of the service quality of the target object is large, a value of a rate used for charging the target object may also be correspondingly large. Moreover, in some other implementations, the first network element may alternatively perform comprehensive charging on the target object based on a plurality of types of information. For example, the first network element may perform comprehensive charging on the target object based on information such as a latency and an amount of invoked resources corresponding to the target object. That is, the charging information of the target object may be a sum of charging information generated by the first network element based on the latency corresponding to the target object and charging information generated based on the amount of invoked resources corresponding to the target object.

In further possible implementations, after completing charging the target object, the first network element may perform a further operation based on the determined charging information. For example, when determining that an advance payment balance for the target object is lower than a current charging amount or that the advance payment balance is lower than a specific threshold, the first network element may generate corresponding balance reminding information or charging balance insufficiency information, to remind, based on the information, the target object that the balance is low or the balance is insufficient.

Certainly, when determining, based on the service quality analytics result or the charging information, that the service quality of the target object is low, the first network element may send corresponding information to the target object, for example, information such as apology information for the low service quality, reason information for the low service quality, or charging exemption obtained due to the low service quality. Certainly, information sent in actual application is not limited to the foregoing examples, and may be configured or set based on an actual application requirement.

In this embodiment, because the service quality analytics result may reflect the service quality of the target object, charging information of a plurality of levels and a plurality of dimensions may be generated of the target object when the service quality of the target object is different. For example, when the service quality of the target object is higher, the target object may be charged higher; when the service quality of the target object is lower, the target object may be charged lower. In this way, the first network element can charge the target object more properly, thereby improving reasonableness and reliability of charging the target object by the first network element. It should be noted that, in this embodiment, the data analytics network element may feed back the service quality analytics result for the target object to the first network element online (for example, when the request received by the data analytics network element includes the online feedback indicator), or may feed back the service quality analytics result for the target object to the first network element offline. The offline feedback is relative to the online feedback, and may specifically indicate that real-time performance of feeding back the service quality analytics result by the data analytics network element may be lower. For example, after the data analytics network element receives the request of the first network element for the service quality analytics result, if the request does not include the online feedback indicator, the data analytics network element may feed back the service quality analytics result to the first network element after a period of time (for example, when the data analytics network element is in a low-load state).

Figure 6:
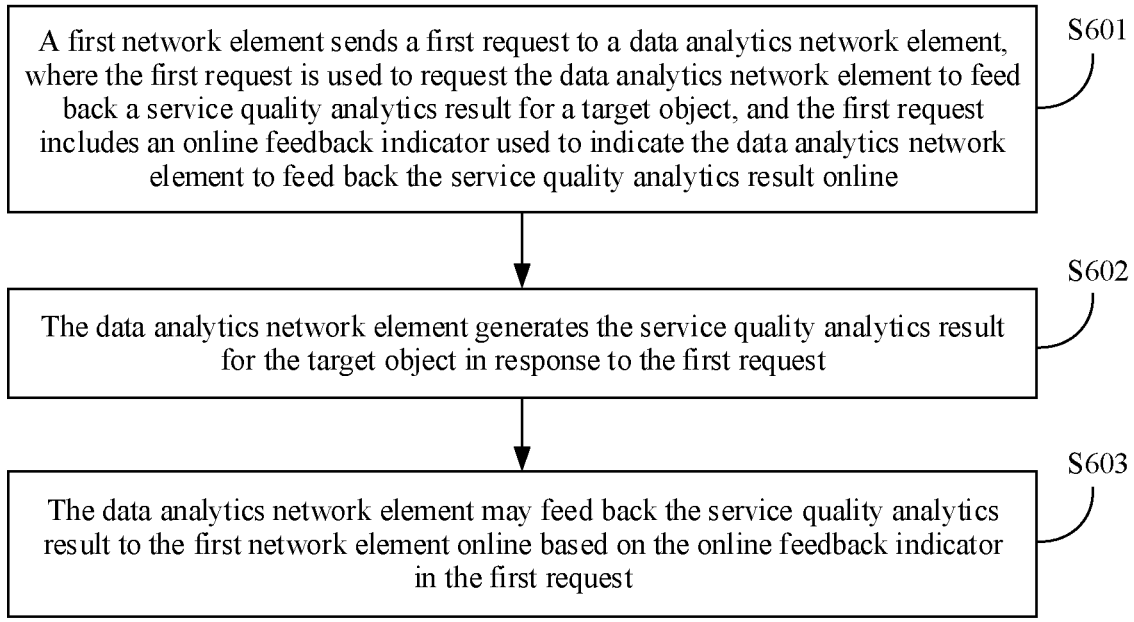
FIG. 6 is a flowchart of a communication method according to another embodiment.

In addition, embodiments of this application further provide a communication method. FIG. 6 is a flowchart of still another communication method according to an embodiment of this application. The method may specifically include the following steps.

S601. A first network element sends a first request to a data analytics network element, where the first request is used to request the data analytics network element to feed back a service quality analytics result for a target object, and the first request includes an online feedback indicator for indicating the data analytics network element to feed back the service quality analytics result online.

In this embodiment, the target object may be specifically one or more services, may be one or more terminal devices (that is, may be a single terminal device, a terminal device group, or the like), or may be one or more networks (where for example, networks in different areas are charged, and the networks may be network slices, slice instances, slice sub-instances, private networks, or public land mobile networks PLMNs).

In specific implementation, when the first network element (for example, a charging function network element or an access network element) needs to obtain the service quality analytics result corresponding to the target object, the first network element may send the first request to the data analytics network element, to request the data analytics network element to feed back the service quality analytics result to the first network element. The first request may be transmitted from the first network element to the data analytics network element via an intermediate network element, or may be transmitted to the data analytics network element through a service-oriented interface between the data analytics network element and the first network element.

It should be noted that, in this embodiment, the first request sent by the first network element may include the online feedback indicator, and a meaning of the online feedback indicator is relative to a meaning of an offline feedback. In other words, the online feedback indicator may be used to indicate the data analytics network element to feed back the service quality analytics result in real time or quasi real time after receiving the first request (that is, require the data analytics network element to complete feeding back the service quality analytics result without any latency).

Optionally, the first request may further include a service quality threshold of the target object.

In some implementations, the service quality threshold may be a reporting threshold of the service quality analytics result specified to the data analytics network element (the NWDAF). For example, when the service quality analytics result is specifically a MOS score, the first network element (the charging function network element) may send a MOS score reporting threshold to the data analytics network element (the NWDAF), to specify that the data analytics network element (the NWDAF) needs to report a real-time MOS score online when the MOS score is lower than 4 points. The data analytics network element (the NWDAF) may determine a corresponding signal quality threshold, for example, RFSP=−115 dB, based on the reporting threshold and a pre-generated service quality analytics model. Then, the data analytics network element (the NWDAF) may send a third request to a RAN to subscribe to signal quality of UE. When the signal quality of the UE is lower than the signal quality threshold, the data analytics network element (the NWDAF) is notified, so that the data analytics network element (the NWDAF) can obtain data from a target network element in real time.

In some other implementations, the service quality threshold may be used by the data analytics network element to set a reporting threshold of a service quality feature parameter. For example, the first network element (the charging function network element) may send a MOS threshold of the target object (the UE) to the data analytics network element (the NWDAF). The threshold is not necessarily used to indicate a MOS score reporting threshold, but is only sent to the data analytics network element (the NWDAF) to set a reporting threshold of each service quality feature parameter. The data analytics network element (the NWDAF) determines a reporting threshold of each service quality feature parameter based on a MOS score reporting threshold and a pre-generated service quality analytics model, and sends the reporting threshold to a corresponding target network element. For example, if the data analytics network element (the NWDAF) determines that a flow bit rate threshold is 200 Mbp and that an RSRP threshold is −115 dB, the data analytics network element (the NWDAF) may send the flow bit rate threshold of 200 Mbp to a UPF and send the RSRP threshold of −115 dB to a RAN. In the method, the target network element reports a service quality feature parameter of the UE to the data analytics network element (the NWDAF) in real time or quasi-real time only when the service quality feature parameter reaches a corresponding reporting threshold, so that the data analytics network element (the NWDAF) generates the MOS of the UE in real time only when receiving the service quality feature parameter, thereby reducing a data volume of service quality feature data obtained by the data analytics network element in real time, reducing a data volume of the service quality analytics result reported to the first network element (the charging function network element), and reducing overheads.

In further possible implementations, when the access network element determines to send a notification message to the data analytics network element, because the data analytics network element obtains the service quality analytics result for the terminal device based on the notification message, the access network element may collect specific data related to the terminal device, use the data as a service quality feature parameter, and send the service quality feature parameter together with the notification message to the data analytics network element. In this way, when receiving the notification message, the data analytics network element may further receive the service quality feature parameter that is required by the data analytics network element to generate the service quality analytics result. In this way, there is no need to request a corresponding service quality feature parameter from the access network element, interaction between the data analytics network element and the access network element is reduced, and network overheads are reduced. In some examples, the service quality feature parameter sent by the access network element may be specifically signal quality, a signal-to-noise ratio, or the like of the terminal device.

In this embodiment, the service quality analytics result may be specifically one or more of the following analytics result types: a latency, a bandwidth, a jitter, a packet loss rate, a location (for example, a location corresponding to a terminal device, a service, or a network slice), an access type (for example, an access type RAT corresponding to a terminal device, a service, or a network slice), an access frequency (for example, access frequency information corresponding to a terminal device, a service, or a network slice), a quantity of invoked resources (which may include, for example, a quantity of invoked air interface resources, a quantity of invoked control plane resources, a quantity of invoked user plane resources, a quantity of invoked network capability APIs, a quantity of invoked CPUs, or a quantity of invoked storage resources), an access point name (access point name, APN), a service-level agreement (service-level agreement, SLA), and a mean opinion score (mean opinion score, MOS).

In further possible implementations, when the target object is specifically a network, the service quality analytics result may be specifically one or more of the following analytics result types: a quantity of registered users, a quantity of online users, a quantity of users corresponding to a target service level, and a quantity of users corresponding to a target service. For example, the target service level may include gold service quality (with the highest service quality), high service quality, normal service quality, and the like. When the service quality analytics result is determined, a quantity of gold users and/or a quantity of high-service-quality users included in the network may be specifically determined.

In other possible implementations, when the target object is a terminal device, the service quality analytics result may specifically include one or more of the following analytics results: a terminal device type, terminal device group information, a (network) slice resource invoked by the terminal device, a mobile edge computing (MEC) platform invoked by a terminal device, a quantity of terminal devices connected to a hotspot, and the like.

S602. The data analytics network element generates the service quality analytics result for the target object in response to the first request.

In this embodiment, after receiving the first request, the data analytics network element may respond to the first request, obtain corresponding service quality feature parameters that are in the network and that are used to generate the service quality analytics result, and further generate the service quality analytics result for the target object based on the service quality feature parameters. In an example, the data analytics network element may generate the second request based on the first request, and send the second request to one or more target network elements in the network, to request the target network element to report, to the data analytics network element, the service quality feature parameter corresponding to the target object. Second requests received by different target network elements may be different, for example, requested service quality feature parameters may also be different. For example, when the target network elements include a user plane function UPF and a base station RAN, a second request sent by the data analytics network element to the UPF may be used to request data such as a traffic bit rate of the target object, and a second request sent by the data analytics network element to the RAN may be used to request data such as an air interface latency and a maximum packet loss rate of the target object. The target network element may obtain, in response to the received second request, service quality feature parameters of the target network element that are related to the target object, and report the service quality feature parameters to the data analytics network element. In this way, the data analytics network element may obtain the service quality analytics result corresponding to the target object by performing corresponding analytics processing on the received service quality feature parameters.

In further possible implementations, the first request sent by the first network element to the data analytics network element may include a target time period, and the target time period may indicate the first network element to request a service quality analytics result corresponding to the target object in the target time period from the data analytics network element. The data analytics network element may generate, based on the first request, the second request including the target time period, and send the second request to the target network element. In this way, the target network element may collect (or observe) service quality feature parameters related to the target object in the target time period based on the target time period in the received second request, and feed back the collected (or observed) service quality feature parameters to the data analytics network element, so that the data analytics network element can generate, based on the collected (or observed) service quality feature parameters, a service quality analytics result that indicates the service quality of the target object in the target time period, and feed back the service quality analytics result to the first network element.

In this embodiment, after obtaining the service quality feature parameters, the data analytics network element may obtain the corresponding service quality analytics result by using a pre-trained service quality analytics model. Specifically, the service quality analytics model may be constructed in advance by using a method such as big data analytics or machine learning, and the service quality analytics model is trained by using at least one group of sample data, where the sample data includes sample service quality feature parameters used as model input and a sample service quality analytics result used as model output, to obtain a function relationship between the sample service quality feature parameters and the sample service quality analytics result. The sample service quality feature parameters may be specifically past service quality feature parameters. For example, the target object is a service. The sample service quality feature parameters may be specifically a parameter such as time, a place, weather, and network load corresponding to a service, and a stream bit rate, a packet loss rate, a bandwidth, and a latency that correspond to the service performed by a sample terminal device, and may be obtained through measurement by the target network element. After training of the service quality analytics model is completed, the data analytics network element may input the obtained service quality feature parameters into the service quality analytics model, and perform analytics by using the service quality analytics model to obtain the corresponding service quality analytics result. For example, the target object is a voice service of the terminal device. A voice service quality model pre-analyzed by the data analytics network element is a function relationship h(X) between a voice service MOS and a service quality parameter such as a corresponding stream bit rate and RSRP of the terminal device, where X indicates a service quality parameter vector, and h(X) indicates a MOS value. To obtain the voice service MOS score corresponding to the terminal device, the data analytics network element may obtain parameters such as a stream bit rate and RSRP of the target terminal device from the target network element in real time/quasi real time, and calculate the voice service MOS of the target terminal device in real time/quasi real time with reference to the function h(X).

In actual application, because the first request sent by the first network element to the data analytics network element includes the online feedback indicator, to enable the data analytics network element to quickly feed back the service quality analytics result to the first network element, the data analytics network element may generate the second request including an online reporting indicator, where the online reporting indicator may be used to indicate the target network element to report the service quality feature parameters corresponding to the target object online (that is, in real time/immediately). In this way, the target network element may feed back the service quality feature parameters related to the target object to the data analytics network element in real time based on the online reporting indicator in the received second request, so that the data analytics network element can quickly obtain the service quality feature parameters and generate the corresponding service quality analytics result based on the service quality feature parameters, and the data analytics network element can feed back the corresponding service quality analytics result to the first network element in a short time period.

In actual application, the first request may further include a reporting periodicity (for example, 10 minutes or 1 hour). In this way, the data analytics network element may periodically feed back the service quality analytics result for the target object to the first network element based on the reporting periodicity in the first request, for example, feed back the service quality analytics result to a target charging function network element every 10 minutes. Certainly, in actual application, the data analytics network element may alternatively set a reporting periodicity for feeding back the service quality analytics result, and periodically report the service quality analytics result for the target object to the first network element based on the reporting periodicity set by the data analytics network element.

In addition, in some implementations, the service quality analytics result fed back by the data analytics network element online may be a service quality analytics result at preset time. In an example, the first request sent by the first network element to the data analytics network element may include the preset time. In this way, when the preset time indicates a current moment, the data analytics network element may immediately obtain the corresponding service quality feature parameters from the target network element, and then may immediately feed back the service quality analytics result to the first network element. When the preset time indicates a future moment, the data analytics network element may perform, when determining that the future moment arrives, a process of generating the service quality analytics result, and feed back the corresponding service quality analytics result to the first network element. For example, the future moment may be a moment at which a terminal device enters a connected state, that is, the first network element may request the data analytics network element to feed back, when the terminal device enters the connected state, a service quality analytics result corresponding to the terminal device. For another example, the future moment may be a moment at which a terminal device performs a service, that is, the first network element may request the data analytics network element to immediately feed back a service quality analytics result corresponding to the terminal device once the terminal device uses the service.

S603. The data analytics network element may feed back the service quality analytics result to the first network element online based on the online feedback indicator in the first request.

In this embodiment, after generating the service quality analytics result corresponding to the target object, the data analytics network element may immediately feed back the service quality analytics result to the first network element (that is, feed back the service quality analytics result to the first network element online), so that the first network element can quickly obtain the service quality analytics result required by the first network element.

In some implementations in actual application, the first network element may charge the target object based on the service quality analytics result fed back by the data analytics network element (certainly, may perform other processing such as cell handover decision on the target object). In an example, the first network element may directly generate the corresponding charging information after receiving the service quality analytics result. In a possible implementation, the first network element may cooperate with another network element to charge the target object. For example, the data analytics network element may send the service quality analytics result to a second network element, and the second network element forwards the service quality analytics result to the first network element. In this way, after receiving the service quality analytics result from the second network element, the first network element may generate corresponding charging information for the target object based on the service quality analytics result. In another possible implementation in actual application, after the data analytics network element sends the service quality analytics result to a second network element, the second network element may generate intermediate information based on the service quality analytics result, where the intermediate information may be considered as another representation form of the service quality analytics result. Then, the second network element may send the intermediate information to the first network element, and the first network element generates the charging information of the target object based on the intermediate information. In an example, the first network element may be specifically any one of a CHF (charging function) network element, a CGF (charging gateway function) network element, a billing domain network element, and a CSIF network element.

The intermediate information may be, for example, intermediate charging information such as an intermediate CDR, or may be information obtained by performing corresponding conversion on the service quality of the target object. The information is another representation form that indicates the service quality, and may be identified by a charging system or a second charging function network element. For example, when the service quality analytics result is a MOS score, the MOS score may be converted into a form such as a latency, a bandwidth, or a latency jitter, or may be converted into a form that can be understood by the charging system or the second charging function network element.

Further, the first network element may further perform dynamic real-time charging on the target object. Specifically, when the first network element determines, based on the service quality analytics result, that the service quality corresponding to the target object does not reach preset service quality, the first network element may reduce charging or even not charge the target object; when the service quality corresponding to the target object reaches the preset service quality, the first network element may charge the target object according to a corresponding charging standard, and generate corresponding charging information. Certainly, in some implementations, for example, the service quality of the target object may be classified into three levels: high service quality, medium service quality, and low service quality. In addition, different rates may be used for charging for different levels of service quality. In this way, after determining, based on the service quality analytics result, the service quality corresponding to the target object, the first network element may determine a service quality level that the service quality meets, to charge the target object at a rate corresponding to the corresponding service quality level. Alternatively, in actual application, the service quality of the target object may be represented by a value, so that the target object can be charged at different rates based on service quality analytics results of different values. For example, when a value of the service quality of the target object is large, a value of a rate used for charging the target object may also be correspondingly large. Moreover, in some other implementations, the first network element may alternatively perform comprehensive charging on the target object based on a plurality of types of information. For example, the first network element may perform comprehensive charging on the target object based on information such as a latency and an amount of invoked resources corresponding to the target object. That is, the charging information of the target object may be a sum of charging information generated by the first network element based on the latency corresponding to the target object and charging information generated based on the amount of invoked resources corresponding to the target object.

In further possible implementations, after completing charging the target object, the first network element may perform a further operation based on the determined charging information. For example, when determining that an advance payment balance for the target object is lower than a current charging amount or that the advance payment balance is lower than a specific threshold, the first network element may generate corresponding balance reminding information or charging balance insufficiency information, to remind, based on the information, the target object that the balance is low or the balance is insufficient.

Certainly, when determining, based on the service quality analytics result or the charging information, that the service quality of the target object is low, the first network element may send corresponding information to the target object, for example, information such as apology information for the low service quality, reason information for the low service quality, or charging exemption obtained due to the low service quality. Certainly, information sent in actual application is not limited to the foregoing examples, and may be configured or set based on an actual application requirement.

In this embodiment, because the request sent by the first network element to the data analytics network element carries the online feedback indicator, the data analytics network element may immediately execute, based on the online feedback indicator, a process of generating the service quality analytics result. Therefore, the first network element can obtain the required service quality analytics result in a short time period, thereby improving real-time performance of performing corresponding processing on the target object. In actual application, after obtaining the service quality analytics result for the target object in real time, the first network element may charge the target object based on the service quality analytics result, or may perform cell handover decision based on the service quality analytics result (in this case, the target object may be a terminal device located in a cell).

Figure 7:
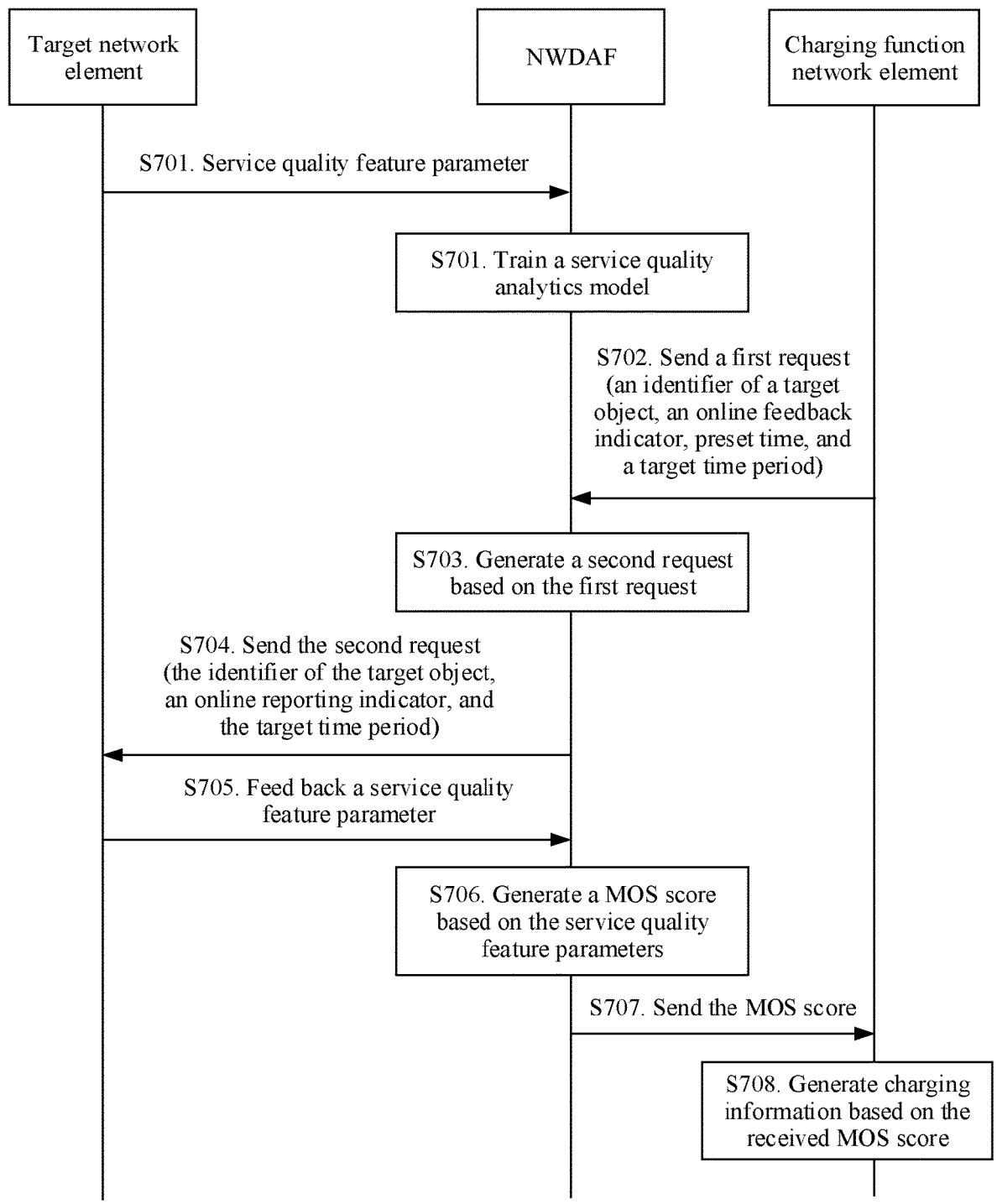
FIG. 7 is a signaling exchange diagram according to an embodiment.

For ease of understanding, the following describes technical solutions in embodiments of this application by using examples with reference to specific scenarios. It should be noted that the scenario embodiment shown in FIG. 7 is merely used as an example for description, and is not intended to limit specific implementation of the technical solutions in embodiments of this application. In actual application, steps and/or information content shown in FIG. 7 may be added or deleted as appropriate. For example, the following first request may include only any one or more of an online feedback indicator, a target time period, and preset time. For specific implementation details of some implementations, refer to related descriptions in the foregoing solution embodiments.

FIG. 7 is a diagram of signaling exchange in a communication method according to an embodiment of this application. In this embodiment, a first network element is specifically a charging function network element, a target network element may include a core network element (such as an AMF, an SMF, a PCF, or a UPF), an access network element (such as a RAN or a gNB), a network management network element (such as an OAM or an NSMF (network slice management function)), a terminal device UE, an application server AF, and the like, a data analytics network element may be specifically an NWDAF, an MDAS, an SON (self-organizing network), or a network element in another representation form. In addition, the data analytics network element and the charging function network element may be integrated or disposed independently. A service quality analytics result in this embodiment may be specifically represented in a plurality of forms, such as a latency, a bandwidth, an SLA, and a MOS. Herein, a mean opinion score (mean opinion score, MOS) analytics result is used as an example for description. The method may specifically include the following steps.

S701. The NWDAF performs training in advance based on an obtained service quality feature parameter to obtain a service quality analytics model.

In this embodiment, the NWDAF may collect, in advance, sample data used for model training, and perform training based on the obtained sample data to obtain the service quality analytics model. The service quality analytics model may output a corresponding service quality analytics result based on the input service quality feature parameter. In this embodiment, the service quality analytics result may be specifically represented by using a MOS score.

In specific implementation, the service quality analytics model may be constructed in advance by using a method such as big data analytics or machine learning, and the service quality analytics model is trained by using sample data obtained from target network elements such as the AMF, the SMF, the PCF, the OAM, the UE, the RAN, the UPF, and the AF. The sample data includes sample service quality feature parameters (such as a UE identifier, a UE location, a service identifier, a latency, a flow bit rate, a packet loss rate, a jitter, and RSRP) used as model input and a sample MOS score used as model output, to obtain a function relationship between the sample service quality feature parameters and the sample MOS score. It should be noted that, when the service quality analytics model is trained, the used sample data may be a large amount of service quality feature data of one or more target objects and corresponding service quality scores. When a service quality analytics result for a specific target object is determined by using the trained service quality analytics model, service quality feature data input into the service quality analytics model may be service quality feature data corresponding to a single target object.

S702. The charging function network element sends a first request to an NWDAF, where the first request includes an identifier of a target object, an online feedback indicator, preset time, a reporting periodicity, and a target time period.

In this embodiment, when the charging function network element needs to obtain a MOS score (a service quality analytics result) corresponding to the target object, the charging function network element may generate the first request, to request the NWDAF to feed back the MOS score. The first request may include the identifier of the target object (for example, a target UE or a target service), to indicate the NWDAF to feed back a MOS score corresponding to a specific target object. The first request may further include the online feedback indicator, and the online feedback indicator may be used to indicate the NWDAF to feed back a MOS score in real time or quasi-real time. The first request may further include the preset time. The preset time is used to indicate when the NWDAF determines the MOS score of the target object. For example, the preset time may be used to indicate the NWDAF to determine the MOS score of the target object when the target object is performing a service. The first request may further include the target time period (for example, from Jan. 10, 2020 to Jan. 11, 2020). The target time period may indicate the NWDAF to determine the MOS score of the target object in the target time period. In addition, the first request may include the reporting periodicity. To be specific, after receiving the first request, the NWDAF may further periodically feed back the service quality analytics result for the target object to the charging function network element based on the reporting periodicity.

Optionally, the first request may further include a service quality threshold of the target object.

In some implementations, the service quality threshold may be a reporting threshold of the service quality analytics result specified to the NWDAF. For example, the charging function network element may send a MOS reporting threshold to the NWDAF, to specify that the NWDAF needs to report a real-time MOS online when the MOS is lower than 4 points. The NWDAF may determine a corresponding signal quality threshold, for example, RFSP-115 dB, based on the reporting threshold and the pre-generated service quality analytics model. Then, the NWDAF may subscribe to, from a RAN, signal quality of the UE. When the signal quality of the UE is lower than the signal quality threshold, the NWDAF is notified, so that the NWDAF can obtain data from the target network element in real time.

In some other implementations, the service quality threshold may be used by the data analytics network element to set a reporting threshold of a service quality feature parameter. For example, the charging function network element sends a MOS threshold of the UE to the NWDAF. The threshold is not necessarily a MOS reporting threshold, but is sent only to the NWDAF to set a reporting threshold of each service quality feature parameter. The NWDAF determines the reporting threshold of each service quality feature parameter based on the MOS threshold and the pre-generated MOS model, and sends the reporting threshold to a corresponding target network element. For example, if the NWDAF determines that a flow bit rate threshold is 200 Mbp and that an RSRP threshold is −115 dB, the NWDAF sends the flow bit rate threshold of 200 Mbp to a UPF, and sends the RSRP threshold of −115 dB to the RAN. In the method, the target network element reports a service quality feature parameter of the UE to the NWDAF in real time or quasi-real time only when the service quality feature parameter reaches a corresponding reporting threshold, so that the NWDAF generates the MOS of the UE in real time only when receiving the service quality feature parameter, thereby reducing a data volume of service quality feature data obtained by the data analytics network element in real time, reducing a data volume of the service quality analytics result reported to the charging function network element, and reducing overheads.

It should be noted that a sequence of performing steps S701 and S702 in actual application is not limited to the example in FIG. 7. That is, in another embodiment, step S702 may be performed before step S701. Specifically, after receiving the first request, the data analytics network element may perform the process of training the service quality analytics model.

S703. The NWDAF generates a second request based on the first request, where the second request includes the identifier of the target object, the online reporting indicator, and the target time period.

In specific implementation, when the NWDAF determines that the preset time arrives (for example, determines that a service of the UE is initiated), the NWDAF may determine the target object based on the identifier of the target object in the first request, and generate the second request based on the first request. The second request may be used to request service quality feature parameters related to the target object from the target network element. Therefore, the second request may include the identifier of the target object. The second request generated by the NWDAF may include the online reporting indicator based on the online feedback indicator in the first request, to indicate the target network element to feed back, in real time or quasi-real time, the service quality feature parameters corresponding to the target object. The target time period in the second request may be used to indicate the target network element to feed back data related to the target object in the target time period.

Service quality feature parameters requested by the NWDAF from different target network elements may be different. For example, the NWDAF may request a flow bit rate corresponding to the target object from the UPF, and request a bandwidth and/or RSRP of the target terminal from the RAN.

S704. The NWDAF sends the second request to the target network element.

After generating the second request, the NWDAF may send the second request to a corresponding target network element. It should be noted that, in this embodiment, the target network element may include a plurality of different network elements. Therefore, second requests sent to the different network elements may be different from each other (for example, reporting conditions of a service quality feature parameter and destination IP addresses are different).

S705. The target network element feeds back a corresponding service quality feature parameter to the NWDAF based on the identifier of the target object, the online reporting indicator, and the target time period in the second request.

When receiving the second request, the target network element may parse the second request, and determine, based on the identifier of the target object in the second request, an object whose service quality feature parameter is to be obtained. In addition, when the second request carries the online reporting indicator, it indicates that the NWDAF requires the target network element to feed back data in real time. In this case, the target network element may obtain, through observation based on the identifier of the target object in the second request, the service quality feature parameter corresponding to the target object, and separately send the service quality feature parameter to the NWDAF. The service quality feature parameter obtained by the target network element through observation is a service quality feature parameter of the target object in the target time period.

In actual application, the second request may further include other information in addition to the online reporting indicator, the identifier of the target terminal, and the target time period. For example, the second request may further include a reporting threshold corresponding to each target network element. That is, the target network element may send a service quality feature parameter that meets the reporting threshold to the NWDAF, and may not send a service quality feature parameter that does not meet the reporting threshold to the NWDAF, thereby reducing an amount of data that needs to be obtained by the NWDAF, and reducing overheads. For another example, the second request may further include a reporting periodicity and the like. In this way, each target network element may further periodically send a service quality feature parameter to the NWDAF based on the reporting periodicity, and the NWDAF does not need to request the service quality feature parameter each time.

S706. The NWDAF generates, based on different service quality feature parameters reported by target network elements online, a MOS score corresponding to the target object.

In specific implementation, the NWDAF may input the obtained service quality feature parameters into the service quality analytics model that is trained in advance, and the service quality analytics model outputs a corresponding service quality analytics result, for example, a MOS score analytics result.

S707. The NWDAF sends the MOS score to the charging function network element.

In some implementations in actual application, when feeding back the MOS score to the charging function network element, the NWDAF may further feed back the identifier of the target object, so that the charging function network element can determine, based on the identifier of the target object, the MOS score as the service quality analytics result corresponding to the target object.

S708. The charging function network element generates charging information of the target object based on the received MOS score.

In actual application, the charging function network element may directly generate the corresponding charging information for the target object based on the received MOS score. In an implementation, the charging function network element may cooperate with another network element to complete a process of charging the target object. In an example, the NWDAF may send the MOS score to an intermediate network element, then the intermediate network element may forward the MOS score to the charging function network element, and the charging function network element generates the corresponding charging information based on the received MOS score. In another possible implementation, the NWDAF may send the MOS score to an intermediate network element. Then, the intermediate network element may generate intermediate information based on the MOS score, for example, may convert the MOS score to obtain the intermediate information that can indicate service quality. Then, the intermediate network element may send the intermediate information to the charging function network element, and the charging function network element generates the charging information of the target object based on the intermediate information.

In actual application, the charging function network element may further perform dynamic charging on the target object based on the MOS score. For example, when the MOS score is high, the target object may be charged at a high rate; when the MOS score is low, the target object may be charged at a low rate or may not be charged. Further, the charging function network element may perform comprehensive charging on the target object based on a plurality of types of information.

Figure 8:
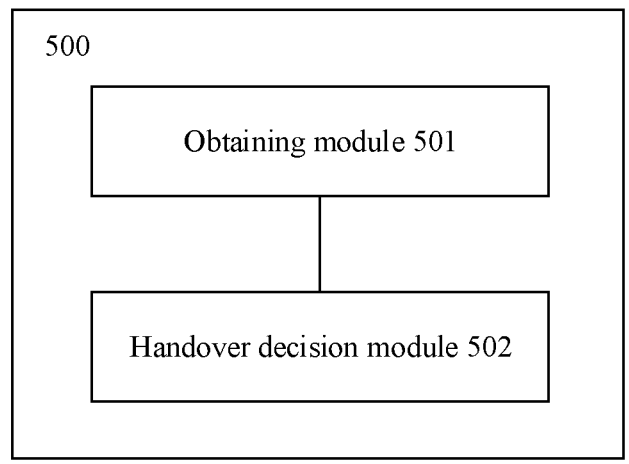
FIG. 8 is a diagram of a structure of a communication apparatus according to an embodiment.

In addition, embodiments of this application further provide a communication apparatus. FIG. 8 is a diagram of a structure of a communication apparatus according to an embodiment of this application. The apparatus 500 may be used in an access network element such as a base station. The apparatus 500 may specifically include:

an obtaining module 501, configured to obtain a service quality analytics result for a target terminal device from a data analytics network element; and a handover decision module 502, configured to perform handover decision on the target terminal device based on the service quality analytics result.

In some possible implementations, the handover decision module 502 is specifically configured to determine to perform cell handover on the target terminal device when the service quality analytics result meets a first preset condition.

The apparatus 500 further includes a handover module, configured to perform cell handover on the target terminal device.

In some possible implementations, the handover decision module 502 is specifically configured to determine to perform cell handover on the target terminal device when the service quality analytics result meets a first preset condition and signal quality of a cell in which the target terminal device is located meets a second preset condition.

In some possible implementations, the apparatus 500 further includes:
a determining module, configured to determine priority information corresponding to the first service quality analytics result and priority information corresponding to the second service quality analytics result.

The handover decision module 502 is specifically configured to perform handover decision on the target terminal device based on the first service quality analytics result, the priority information corresponding to the first service quality analytics result, the second service quality analytics result, and the priority information corresponding to the second service quality analytics result.

In some possible implementations, the apparatus 500 further includes:
a reporting module, configured to report an access network parameter value that can be met by the access network element to the data analytics network element, where the access network parameter value is used to generate the service quality analytics result.

In some possible implementations, the obtaining module 501 includes:
a sending unit, configured to send a service quality analytics request to the data analytics network element, where the service quality analytics request is used to request the service quality analytics result from the data analytics network element; and
a receiving unit, configured to receive the service quality analytics result sent by the data analytics network element in response to the service quality analytics request.

In some possible implementations, the sending unit is specifically configured to: send a service quality analytics request for the target terminal device to the data analytics network element when the access network element receives a measurement report reported by the target terminal device; or send a service quality analytics request for the target terminal device to the data analytics network element when a measurement report received by the access network element indicates that the signal quality of the cell in which the target terminal device is located meets a third preset condition.

In some possible implementations, the service quality analytics request includes indication information, and the indication information indicates to request a service quality analytics result corresponding to an online service of the target terminal device.

In some possible implementations, the service quality analytics result meets a reporting condition, and the apparatus 500 further includes a sending module, configured to send the reporting condition to the data analytics network element.

It should be noted that, content such as information exchange and an execution process between the modules or units of the foregoing apparatus is based on a same conception as the method embodiment in embodiments of this application, and brings a technical effect the same as that of the method embodiment in embodiments of this application. For specific content, refer to the description in the method embodiment shown above in embodiments of this application, and details are not described herein again.

Figure 9:
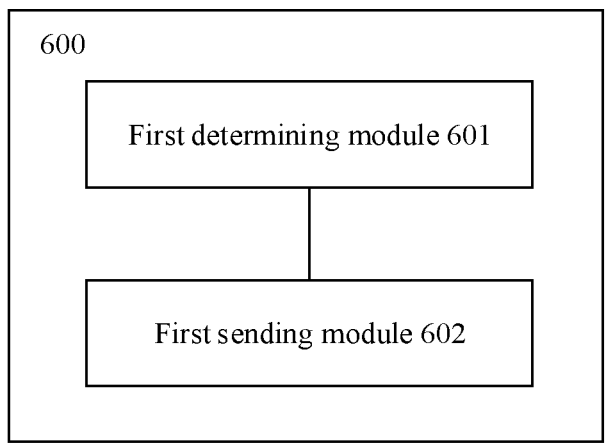
FIG. 9 is a diagram of a structure of another communication apparatus according to an embodiment.

In addition, embodiments of this application further provide another communication apparatus. FIG. 9 is a diagram of a structure of a communication apparatus according to an embodiment of this application. The apparatus 600 includes:
a first determining module 601, configured to determine a service quality analytics result for a target terminal device; and
a first sending module 602, configured to send the service quality analytics result to an access network element, where the service quality analytics result is used to perform handover decision on the target terminal device.

In some possible implementations, the service quality analytics result includes a first service quality analytics result and a second service quality analytics result for the target terminal device, and the first service quality analytics result and the second service quality analytics result correspond to different service types or data transmission channels.

In some possible implementations, the apparatus 600 further includes:
a second sending module, configured to send first indication information to the access network element, where the first indication information is used to indicate that the service quality analytics result is a service quality analytics result corresponding to an online service of the target terminal device.

In some possible implementations, the apparatus 600 further includes:
a first receiving module, configured to receive a service quality analytics request sent by the access network element or a core network element, where the service quality analytics request is used to request the service quality analytics result for the target terminal device.

In some possible implementations, the service quality analytics request includes second indication information, and the second indication information indicates to request the service quality analytics result corresponding to the online service of the target terminal device.

In some possible implementations, the apparatus 600 further includes:
an obtaining module, configured to obtain a core network parameter value that can be met by the core network element.

The first determining module is specifically configured to determine the service quality analytics result for the target terminal device based on the core network parameter value.

In some possible implementations, the first determining module 601 includes:
an obtaining unit, configured to obtain, in response to the service quality analytics request, a corresponding service feature parameter used to generate the service quality analytics result for the target terminal device; and
an analytics processing unit, configured to perform analytics processing on the service feature parameter to obtain the service quality analytics result.

In some possible implementations, the service feature parameter meets a first reporting condition, and the apparatus 600 further includes:

a second receiving module, configured to receive a second reporting condition sent by the access network element or the core network element for the service quality analytics result; and a second determining module, configured to determine the first reporting condition of the service feature parameter based on the second reporting condition.

In some possible implementations, the first sending module 602 is specifically configured to send the service quality analytics result to the access network element when the service quality analytics result meets the second reporting condition.

In some possible implementations, the apparatus 600 further includes:

a third receiving module, configured to receive an updated network parameter value sent by the core network element;

a third determining module, configured to determine an updated service quality analytics result based on the updated network parameter value; and a third sending module, configured to send the updated service quality analytics result to the access network element.

It should be noted that, content such as information exchange and an execution process between the modules or units of the foregoing apparatus is based on a same conception as the method embodiment in embodiments of this application, and brings a technical effect the same as that of the method embodiment in embodiments of this application. For specific content, refer to the description in the method embodiment shown above in embodiments of this application, and details are not described herein again.

Figure 10:
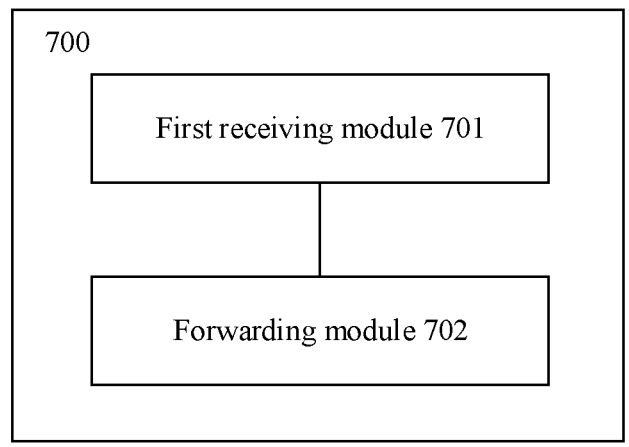
FIG. 10 is a diagram of a structure of still another communication apparatus according to an embodiment.

In addition, embodiments of this application further provide still another communication apparatus. FIG. 10 is a diagram of a structure of a communication apparatus according to an embodiment of this application. The apparatus 700 includes:

a first receiving module 701, configured to receive a service quality analytics result for a target terminal device sent by a data analytics network element; and a forwarding module 702, configured to forward the service quality analytics result to an access network element, so that the access network element performs handover decision on the target terminal device based on the service quality analytics result.

In some possible implementations, the service quality analytics result includes a first service quality analytics result and a second service quality analytics result for the target terminal device, and the apparatus 700 further includes:

a delivery module, configured to deliver, to the access network element, priority information corresponding to the first service quality analytics result and priority information corresponding to the second service quality analytics result, where the priority information corresponding to the first service quality analytics result and the priority information corresponding to the second service quality analytics result are used to perform cell handover decision on the target terminal device.

In some possible implementations, the apparatus 700 further includes:

a first sending module, configured to send a service quality analytics request to the data analytics network element, where the service quality analytics request is used to request the service quality analytics result for the target terminal device from the data analytics network element.

In some possible implementations, the service quality analytics request includes indication information, and the indication information indicates to request a service quality analytics result corresponding to an online service of the target terminal device.

In some possible implementations, the apparatus 700 further includes:

a second receiving module, configured to receive a service establishment request sent by a service server, where the service establishment request is used to establish a service of the target terminal device.

In some possible implementations, the apparatus 700 further includes:

a reporting module, configured to report a core network parameter value that can be met by the core network element to the data analytics network element, where the core network parameter value is used to generate the service quality analytics result.

In some possible implementations, the reporting module includes:

a receiving unit, configured to receive a data report request sent by the data analytics network element, where the data report request is used to request the core network element to report a corresponding service feature parameter for generating the service quality analytics result for the target terminal device; and a reporting unit, configured to report the service feature parameter to the data analytics network element in response to the data report request.

In some possible implementations, the service feature parameter meets a first reporting condition, where the first reporting condition is determined based on a second reporting condition, and the second reporting condition is used to indicate the data analytics network element to send the service quality analytics result to the core network element when the service quality analytics result meets the second reporting condition.

In some possible implementations, the apparatus 700 further includes:

an adjustment module, configured to adjust, when the core network element determines that the received service quality analytics result meets a preset condition, a network parameter value corresponding to the service quality analytics result to obtain an updated network parameter value.

In some possible implementations, the apparatus 700 further includes:

a second sending module, configured to send the updated parameter value to the data analytics network element; and a third receiving module, configured to receive an updated service quality analytics result determined by the data analytics network element based on the updated network parameter value.

In some possible implementations, the apparatus 700 further includes:

a third sending module, configured to send the updated service quality analytics result to the access network element.

It should be noted that, content such as information exchange and an execution process between the modules or units of the foregoing apparatus is based on a same conception as the method embodiment in embodiments of this application, and brings a technical effect the same as that of the method embodiment in embodiments of this application. For specific content, refer to the description in the method embodiment shown above in embodiments of this application, and details are not described herein again.

Figure 11:
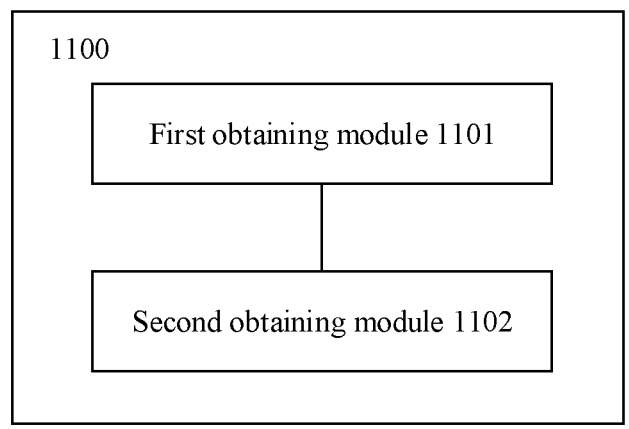
FIG. 11 is a diagram of a structure of still another communication apparatus according to an embodiment.

In addition, embodiments of this application further provide a communication apparatus. FIG. 11 is a diagram of a structure of still another communication apparatus according to an embodiment of this application. The apparatus 1100 may be used in a first network element, and the apparatus 1100 includes:
- a first obtaining module 1101, configured to obtain, from a data analytics network element, information about a service quality analytics result for a target object; and
- a second obtaining module 1102, configured to obtain charging information of the target object based on the information about the service quality analytics result.

In some possible implementations, the first obtaining module 1101 is specifically configured to receive the service quality analytics result from a second network element.

In some possible implementations, the first obtaining module 1101 is specifically configured to receive intermediate information of the service quality analytics result from the second network element; and
- the second obtaining module 1102 is specifically configured to obtain the charging information of the target object based on the intermediate information.

In some possible implementations, the first obtaining module 1101 includes:
- a third sending unit, configured to send a first request to the data analytics network element, where the first request is used to request the data analytics network element to feed back the service quality analytics result for the target object to the first network element; and
- a receiving unit, configured to receive the service quality analytics result that is for the target object and that is sent by the data analytics network element in response to the first request.

In some possible implementations, the first request includes a first indication, and the first indication is used to indicate the data analytics network element to feed back the service quality analytics result for the target object online.

In some possible implementations, the first request includes a reporting periodicity, and the reporting periodicity is used to indicate the data analytics network element to feed back the service quality analytics result for the target object based on the reporting periodicity.

In some possible implementations, the target object includes any one or more of a network, a terminal device, and a service, and the first request includes any one or more of a network identifier, a terminal device identifier, and a service identifier.

In some possible implementations, the service quality analytics result includes a service quality analytics result corresponding to preset time.

In some possible implementations, the service quality analytics result is determined based on a service quality feature parameter obtained in a target time period.

In some possible implementations, the service quality analytics result includes one or more of the following analytics result types: a latency, a bandwidth, a jitter, a packet loss rate, a location, an access type, an access frequency, an amount of invoked resources, an access point name APN, a service level agreement SLA, and a mean opinion score MOS.

In some possible implementations, when the target object is a network, the service quality analytics result includes one or more of the following analytics result types: a quantity of registered users, a quantity of online users, a quantity of users corresponding to a target service level, and a quantity of users corresponding to a target service.

In some possible implementations, when the target object is a terminal device, the service quality analytics result includes one or more of the following analytics result types: a user equipment type, user equipment group information, a slice resource invoked by a user, a multi-access edge computing MEC platform invoked by a user, and a quantity of user equipments connected to a target hotspot.

It should be noted that, content such as information exchange and an execution process between the modules or units of the foregoing apparatus is based on a same conception as the corresponding method embodiment in embodiments of this application, and brings a technical effect the same as that of the method embodiment in embodiments of this application. For specific content, refer to the description in the method embodiment shown above in embodiments of this application, and details are not described herein again.

Figure 12:
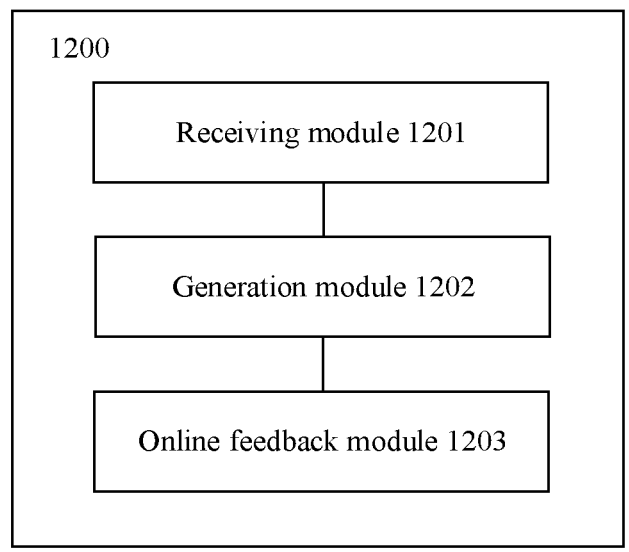
FIG. 12 is a diagram of a structure of still another communication apparatus according to an embodiment.

In addition, embodiments of this application further provide a communication apparatus. FIG. 12 is a diagram of a structure of still another communication apparatus according to an embodiment of this application. The apparatus 1200 may be used in a first network element, and the apparatus 1200 includes:
- a receiving module 1201, configured to receive a first request from a first network element, where the first request is used to request the data analytics network element to feed back a service quality analytics result for a target object, and the first request includes an online feedback indicator for indicating the data analytics network element to feed back the service quality analytics result online;
- a generation module 1202, configured to generate the service quality analytics result for the target object; and
- an online feedback module 1203, configured to feed back the service quality analytics result to the first network element online based on the online feedback indicator in the first request.

In some possible implementations, the generation module 1202 includes:
- a sending unit, configured to send a second request to a target network element based on the first request, where the second request is used to request the target network element to report a service quality feature parameter, and the second request includes an online reporting indicator for indicating the target network element to report the service quality feature parameter online; and
- a generation unit, configured to generate the service quality analytics result for the target object based on the service quality feature parameter reported by the target network element online.

In some possible implementations, the service quality analytics result is used by the first network element to generate charging information of the target object based on the service quality analytics result.

In some possible implementations, the first request further includes a reporting periodicity. The feeding back the service quality analytics result to the first network element online includes: The data analytics network element feeds back the service quality analytics result to the first network element online based on the reporting periodicity.

In some possible implementations, the target object includes any one or more of a network, a terminal device, and a service, and the first request includes any one or more of a network identifier, a terminal device identifier, and a service identifier.

In some possible implementations, the service quality analytics result includes a service quality analytics result corresponding to preset time.

In some possible implementations, the service quality analytics result is determined based on a service quality feature parameter obtained in a target time period.

In some possible implementations, the service quality analytics result includes one or more of the following analytics result types: a latency, a bandwidth, a jitter, a packet loss rate, a location, an access type, an access frequency, an amount of invoked resources, an access point name APN, a service level agreement SLA, and a mean opinion score MOS.

In some possible implementations, when the target object is a network, the service quality analytics result includes one or more of the following analytics result types: a quantity of registered users, a quantity of online users, a quantity of users corresponding to a target service level, and a quantity of users corresponding to a target service.

In some possible implementations, when the target object is a terminal device, the service quality analytics result includes one or more of the following analytics result types: a user equipment type, user equipment group information, a slice resource invoked by a user, a multi-access edge computing MEC platform invoked by a user, and a quantity of user equipments connected to a target hotspot.

It should be noted that, content such as information exchange and an execution process between the modules or units of the foregoing apparatus is based on a same conception as the corresponding method embodiment in embodiments of this application, and brings a technical effect the same as that of the method embodiment in embodiments of this application. For specific content, refer to the description in the method embodiment shown above in embodiments of this application, and details are not described herein again.

In addition, embodiments of this application further provide a device. The device may be used in an access network element, a core network element, or a data analytics network element mentioned in the foregoing method embodiments. The device may include a processor and a memory, and the processor is coupled to the memory.

The memory is configured to store a computer program or instructions.

The processor is configured to execute the computer program or the instructions, so that the communication method performed by the access network element in the foregoing method embodiments is performed or the communication method performed by the data analytics network element in the foregoing method embodiments is performed.

In some possible implementations, the processor executes the computer program or the instructions, so that the communication method performed by the core network element in the foregoing method embodiments can be performed.

Figure 13:
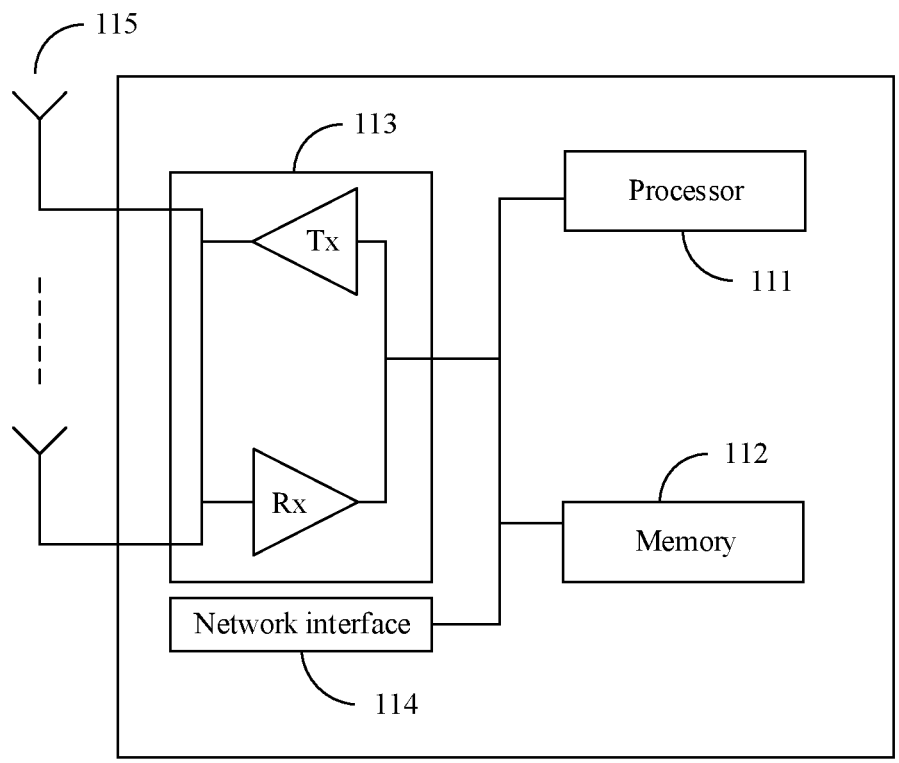
FIG. 13 is a schematic diagram of a hardware structure of an access network device according to an embodiment.

FIG. 13 is a schematic diagram of a hardware structure of an access network device, and the access network device may be an access network element in embodiments of this application. The access network device includes at least one processor 111, at least one memory 112, at least one transceiver 113, at least one network interface 114, and one or more antennas 115. The processor 111, the memory 112, the transceiver 113, and the network interface 114 are connected, for example, through a bus. In this embodiment of this application, the connection may include various interfaces, transmission lines, buses, or the like, and this is not limited in this embodiment. The antenna 115 is connected to the transceiver 113. The network interface 114 is configured to enable an access network device to connect to another communications device through a communications link. For example, the network interface 114 may include a network interface, for example, an Si interface, between the access network device and a core network element, and the network interface may include a network interface, for example, an X2 or Xn interface, between the access network device and another access network device.

The processor 111 shown in FIG. 13 may specifically complete processing actions performed by the access network element in the foregoing methods, the memory 112 may complete storage actions in the foregoing methods, the transceiver 113 and the antenna 115 may perform receiving and sending actions over an air interface in the foregoing methods, and the network interface 114 may complete interaction actions with the core network element or the data analytics network element in the foregoing methods. An example in which the device shown in FIG. 13 is used in the access network element is used for description below.

The processor 111 may perform handover decision on a target terminal device based on a service quality analytics result for the target terminal device that is from the data analytics network element. The transceiver 113 may receive the service quality analytics result sent by the data analytics network element. The memory 112 may store the service quality analytics result. For specific content of the service quality analytics result, refer to related descriptions in other embodiments.

The processor, for example, the processor 111, in this embodiment of this application may include but is not limited to at least one of the following: a central processing unit (CPU), a microprocessor, a digital signal processor (DSP), a microcontroller unit (MCU), and various types of computing devices, such as an artificial intelligence processor, that run software, where each computing device may include one or more cores configured to execute software instructions to perform an operation or perform processing. The processor may be an independent semiconductor chip, or may be integrated with another circuit to form a semiconductor chip. For example, the processor and another circuit (for example, an encoding/decoding circuit, a hardware acceleration circuit, or various buses and interface circuits) may form a SoC (system-on-a-chip). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (FPGA), a PLD (programmable logic device), or a logic circuit that implements a dedicated logic operation.

The memory in embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in a form of instructions or a data structure and that can be accessed by a computer. However, the memory is not limited thereto.

The memory 112 may exist independently and is connected to the processor 111. Optionally, the memory 112 and the processor 111 may be integrated together, for example, integrated in a chip. The memory 112 can store program code that executes the technical solutions in embodiments of this application, and the processor 111 controls execution of the program code. Various types of computer program code that are executed may also be considered as drivers of the processor 111. For example, the processor 111 is configured to execute the computer program code stored in the memory 112, to implement the technical solutions in embodiments of this application.

The transceiver 113 may be configured to support receiving or sending of a radio frequency signal between the access network device and the terminal, and the transceiver 113 may be connected to the antenna 115. The transceiver 113 includes a transmitter Tx and a receiver Rx. Specifically, the one or more antennas 115 may receive the radio frequency signal. The receiver Rx of the transceiver 113 is configured to: receive the radio frequency signal from the antenna, convert the radio frequency signal into a digital baseband signal or a digital intermediate frequency signal, and provide the digital baseband signal or the digital intermediate frequency signal for the processor 111, so that the processor 111 further processes the digital baseband signal or the digital intermediate frequency signal, for example, performs demodulation processing and decoding processing. In addition, the transmitter Tx of the transceiver 113 is further configured to: receive a modulated digital baseband signal or digital intermediate frequency signal from the processor 111, convert the modulated digital baseband signal or digital intermediate frequency signal into a radio frequency signal, and send the radio frequency signal through the one or more antennas 115. Specifically, the receiver Rx may selectively perform one or more levels of down-mixing processing and analog-to-digital conversion processing on the radio frequency signal to obtain a digital baseband signal or a digital intermediate frequency signal, and a sequence of the down-mixing processing and the analog-to-digital conversion processing is adjustable. The transmitter Tx may selectively perform one or more levels of up-mixing processing and digital-to-analog conversion processing on the modulated digital baseband signal or the digital intermediate frequency signal to obtain a radio frequency signal, and a sequence of the up-mixing processing and the digital-to-analog conversion processing is adjustable. The digital baseband signal and the digital intermediate frequency signal may be collectively referred to as a digital signal.

Figure 14:
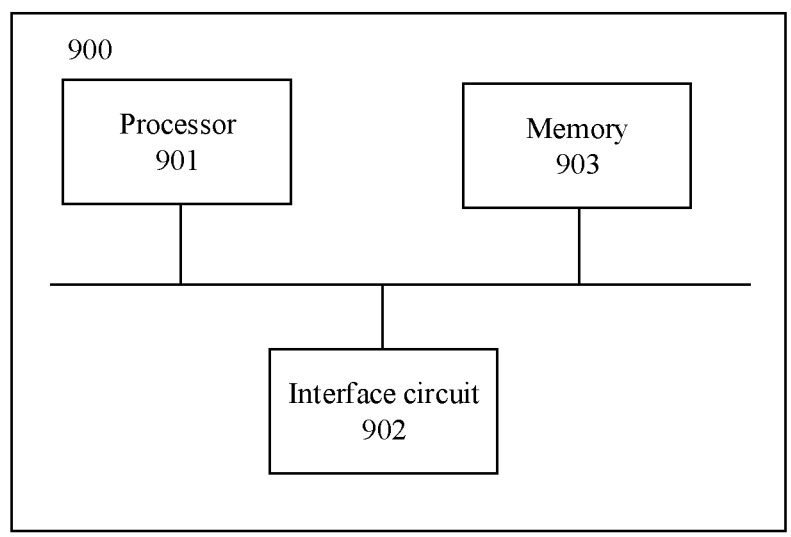
FIG. 14 is a schematic diagram of a structure of a data analytics network element according to an embodiment.

In addition, embodiments of this application further provide a data analytics network element. As shown in FIG. 14, the data analytics network element 900 may include a processor 901 and an interface circuit 902. Further, the data analytics network element 900 may include a memory 903. The processor 901 of the data analytics network element 900 may complete actions performed by the data analytics network element in the foregoing methods, the interface circuit 902 may complete sending or receiving of a signal between the data analytics network element 900 and another component or device, the interface circuit 902 and the another component or device may collaboratively complete interaction with another network element in the foregoing methods, and the memory 903 may complete storage actions in the foregoing methods. The following provides an example for description.

The processor 901 may perform handover decision on a target terminal device based on a service quality analytics result for the target terminal device that is from the data analytics network element. The transceiver 113 may receive the service quality analytics result sent by the data analytics network element. The memory 112 may store the service quality analytics result. For specific content of the service quality analytics result, refer to related descriptions in other embodiments.

In the foregoing embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

Embodiments of this application further provide a computer-readable storage medium. All or some of the methods described in the foregoing embodiments may be implemented by using software, hardware, firmware, or any combination thereof. If implemented in software, the function may be stored as one or more instructions or code on the computer-readable medium or transmitted on a computer-readable medium. The computer-readable medium may include a computer storage medium and a communications medium, and may further include any medium capable of transferring a computer program from one place to another. The storage medium may be any target medium that can be accessed by a computer.

In an optional design, the computer-readable medium may include a RAM, a ROM, an EEPROM, a CD-ROM or another optical disc storage, a magnetic disk storage or another magnetic storage device, or any other medium that is used to carry or store required program code in a form of instructions or a data structure and that is accessible by the computer. In addition, any connection may be appropriately referred to as a computer-readable medium. For example, if software is transmitted from a website, a server, or another remote source by using a coaxial cable, a fiber optical cable, a twisted pair, a digital subscriber line (DSL), or wireless technologies (for example, infrared ray, radio, and microwave), the coaxial cable, the fiber optical cable, the twisted pair, the DSL, or the wireless technologies such as infrared ray, radio and microwave are included in the definition of a medium. Disks and discs as used herein include optical discs (CDs), laser discs, optical discs, digital versatile discs (DVDs), floppy disks, and Blu-ray discs, where disks typically reproduce data magnetically, and discs reproduce data optically using lasers. The combination described above should also be included in the scope of the computer-readable medium.

Embodiments of this application further provide a computer program product. All or some of the methods described in the foregoing embodiments may be implemented by using software, hardware, firmware, or any combination thereof. If implemented in software, the method described in the foregoing method embodiments may be implemented entirely or partially in a form of the computer program product. The computer program product includes one or more computer instructions. When the computer program instructions are loaded and executed on a computer, the procedures or functions according to the foregoing method embodiments are completely or partially generated. The computer may be a general-purpose computer, a dedicated computer, a computer network, a base station, a terminal, or another programmable apparatus.

It should be noted that in this application, "of", "corresponding (corresponding, relevant)" may be interchangeably used sometimes. It should be noted that, consistent meanings are expressed when differences are not emphasized.

It should be noted that, in embodiments of this application, the word "example" or "for example" is used to represent giving an example, an illustration, or a description. Any embodiment or design scheme described as "example" or "for example" in embodiments of this application should not be explained as being more preferred or having more advantages than another embodiment or design scheme. Exactly, use of the word such as "example" or "for example" is intended to present a related concept in a specific manner.

In this application, "at least one" refers to one or more. "A plurality of" refers to two or more than two. The term "and/or" describes an association relationship between associated objects and represents that three relationships may exist. For example, A and/or B may represent the following cases: Only A exists, both A and B exist, and only B exists, where A and B may be singular or plural. The character "I" generally represents an "or" relationship between the associated objects. At least one of the following items (pieces) or a similar expression thereof indicates any combination of these items, including a single item (piece) or any combination of a plurality of items (pieces). For example, at least one of a, b, or c may indicate: a; b; c; a and b; a and c; b and c; or a, b, and c; where a, b, and c may be singular or plural. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and that the terms such as "first" and "second" do not indicate a definite difference.

A system architecture and a service scenario described in embodiments of this application are intended to describe the technical solutions in embodiments of this application more clearly, and do not constitute any limitation on the technical solutions provided in embodiments of this application. A person of ordinary skill in the art may know that with evolution of a network architecture and emergence of a new service scenario, the technical solutions provided in embodiments of this application are also applicable to similar technical problems.

What is claimed is:

1. A communication method, comprising:
obtaining, by an access network element, a service quality analytics result for a target terminal device from a data analytics network element, wherein the service quality analytics result corresponds to a first service quality of at least one service of the target terminal device and is sent when a second service quality indicated by an updated service quality analytics result does not meet a preset condition, the updated service quality result is determined based on an updated network parameter that is to be used for adjusting a corresponding parameter of the target terminal device; and
performing, by the access network element, a handover decision on the target terminal device based on the service quality analytics result corresponding to the first service quality of the at least one service of the target terminal device.

2. The method according to claim 1, wherein performing the handover decision comprises:
determining, by the access network element, to perform cell handover on the target terminal device when the service quality analytics result meets a first preset condition; and
performing, by the access network element, cell handover on the target terminal device.

3. The method according to claim 1, wherein performing the handover decision comprises:
determining, by the access network element, to perform cell handover on the target terminal device when the service quality analytics result meets a first preset condition and signal quality of a cell in which the target terminal device is located meets or exceeds a second preset condition.

4. The method according to claim 1, wherein the service quality analytics result comprises a first service quality analytics result and a second service quality analytics result for the target terminal device, the method further comprising:
determining, by the access network element, first priority information corresponding to the first service quality analytics result and second priority information corresponding to the second service quality analytics result; and
performing the handover decision on the target terminal device based on the service quality analytics result comprises:
performing, the handover decision on the target terminal device based on the first service quality analytics result, the first priority information corresponding to the first service quality analytics result, the second service quality analytics result, and the second priority information corresponding to the second service quality analytics result.

5. The method according to claim 1, wherein the method further comprises:
reporting, by the access network element to the data analytics network element, an access network parameter value that can be met by the access network element, wherein the access network parameter value is used to generate the service quality analytics result.

6. The method according to claim 1, wherein the obtaining, by an access network element, a service quality analytics result for a target terminal device from a data analytics network element comprises:

sending, by the access network element, a service quality analytics request to the data analytics network element to obtain the service quality analytics result from the data analytics network element; and receiving, by the access network element, the service quality analytics result from the data analytics network element in response to the service quality analytics request.

7. The method according to claim 6, wherein the sending of the service quality analytics request to the data analytics network element comprises:

sending, by the access network element to the data analytics network element, a service quality analytics request for the target terminal device when the access network element receives a measurement report reported by the target terminal device; or sending, by the access network element to the data analytics network element, a service quality analytics request for the target terminal device when a measurement report received by the access network element indicates that the signal quality of the cell in which the target terminal device is located meets a third preset condition.

8. The method according to claim 6, wherein the service quality analytics request comprises indication information to request a service quality analytics result corresponding to an online service of the target terminal device.

9. The method according to claim 1, further comprising:

determining, by the data analytics network element, the service quality analytics result for the target terminal device; and sending, by the data analytics network element, the service quality analytics result to the access network element.

10. The method according to claim 9, the method further comprising:

sending, by the data analytics network element, first indication information to the access network element, the first indication information indicating that the service quality analytics result is a service quality analytics result corresponding to an online service of the target terminal device.

11. The communication method according to claim 1, wherein the service quality analytics result is the updated service quality analytics result or an original service quality analytics result.

12. An apparatus, comprising at least one processor and a non-transitory memory, wherein the at least one processor is coupled to the non-transitory memory storing computer instructions that, when executed by the at least one processor, cause the apparatus to:

obtain a service quality analytics result for a target terminal device from a data analytics network element, wherein the service quality analytics result corresponds to a first service quality of at least one service of the target terminal device and is sent when a second service quality indicated by an updated service quality analytics result does not meet a preset condition, the updated service quality result is determined based on an updated network parameter that is to be used for adjusting a corresponding parameter of the target terminal device; and perform a handover decision on the target terminal device based on the service quality analytics result corresponding to the first service quality of the at least one service of the target terminal device.

13. The apparatus according to claim 12, wherein the instructions, when executed by the at least one processor, cause the apparatus to:

determine to perform cell handover on the target terminal device when the service quality analytics result meets a first preset condition; and the instructions, upon execution by the at least one processor, cause the apparatus to perform cell handover on the target terminal device.

14. The apparatus according to claim 12, wherein the instructions, when executed by the at least one processor, cause the apparatus to:

determine to perform cell handover on the target terminal device when the service quality analytics result meets a first preset condition and signal quality of a cell in which the target terminal device is located meets a second preset condition.

15. The apparatus according to claim 12, wherein the service quality analytics result comprises a first service quality analytics result and a second service quality analytics result for the target terminal device and the instructions, when executed by the at least one processor, cause the apparatus to:

determine first priority information corresponding to the first service quality analytics result and second priority information corresponding to the second service quality analytics result.

16. The apparatus according to claim 15, wherein the instructions, when executed by the at least one processor, cause the apparatus to:

perform the handover decision on the target terminal device based on the first service quality analytics result, the first priority information corresponding to the first service quality analytics result, the second service quality analytics result, and the second priority information corresponding to the second service quality analytics result.

17. The apparatus according to claim 12, wherein the instructions, when executed by the at least one processor, cause the apparatus to:

report to the data analytics network element an access network parameter value that can be met by the access network element and to generate the service quality analytics result.

18. The apparatus according to claim 12, wherein the instructions, when executed by the at least one processor, cause the apparatus to:

send to the data analytics network element a service quality analytics request to obtain the service quality analytics result from the data analytics network element; and receive the service quality analytics result from the data analytics network element in response to the service quality analytics request.

19. The apparatus according to claim 12, wherein the instructions, when executed by the at least one processor, cause the apparatus to:

send to the data analytics network element a service quality analytics request for the target terminal device when the access network element receives a measurement report reported by the target terminal device; or send to the data analytics network element a service quality analytics request for the target terminal device when a measurement report received by the access network element indicates that the signal quality of the cell in which the target terminal device is located meets a third preset condition.

20. A communication system, comprising an access network element and a data analytics network element,
- wherein the data analytics network element comprises a first processor and is configured to:
  - determine a first service quality analytics result for a target terminal device, wherein service quality analytics result corresponds to a first service quality of at least one service of the target terminal device; and
  - when a second service quality of the target terminal device indicated by the updated service quality analytics result does not meet a preset condition, send a service quality analytics result to the access network element, wherein the updated service quality analytics result is determined based on an updated network parameter that is to be used for adjusting a corresponding network parameter of the target terminal device; and
- wherein the access network element comprises a second processor and is configured to:
  - obtain the service quality analytics result for the target terminal device from the data analytics network element; and
  - perform handover decision on the target terminal device based on the service quality analytics result corresponding to the first service quality of the at least one service of the target terminal device.

* * * * *